US011953841B2

(12) United States Patent
Otsuka

(10) Patent No.: US 11,953,841 B2
(45) Date of Patent: Apr. 9, 2024

(54) IMAGE FORMING APPARATUS PROVIDED WITH CHARGING ROLLER

(71) Applicant: SHARP KABUSHIKI KAISHA, Sakai (JP)

(72) Inventor: Masayuki Otsuka, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/111,716

(22) Filed: Feb. 20, 2023

(65) Prior Publication Data

US 2023/0266692 A1 Aug. 24, 2023

(30) Foreign Application Priority Data

Feb. 21, 2022 (JP) ................................ 2022-025004

(51) Int. Cl.
*G03G 15/02* (2006.01)

(52) U.S. Cl.
CPC ..... *G03G 15/0266* (2013.01); *G03G 15/0283* (2013.01)

(58) Field of Classification Search
CPC ....................... G03G 15/0266; G03G 15/0283
USPC ........................................................... 399/50
See application file for complete search history.

(56) References Cited

FOREIGN PATENT DOCUMENTS

| | | | |
|---|---|---|---|
| CN | 101118400 | * | 2/2008 |
| JP | 2018-177995 A | | 11/2018 |

* cited by examiner

*Primary Examiner* — Hoan H Tran
(74) *Attorney, Agent, or Firm* — ScienBiziP, P.C.

(57) ABSTRACT

An image forming apparatus according to this disclosure includes: a charging roller that charges a surface of a photoconductor drum; a development unit that forms a toner image on the surface of the photoconductor drum; an image density sensor that detects density of the formed toner image; a charge power supply that applies a bias voltage to the charging roller; a development power supply that applies a bias voltage to the development unit; and a controller. The controller causes the charge and development power supplies to output respective predetermined bias voltages for predetermined time, and is capable of executing a contact and separation determination mode in which a contact and separation state of the charging roller is determined based on whether or not an image is detected by the image density sensor after output of the respective bias voltages.

10 Claims, 15 Drawing Sheets

IMAGE FORMING APPARATUS PROVIDED WITH CHARGING ROLLER

BACKGROUND OF THE INVENTION

Field of the Invention

The present disclosure relates to an image forming apparatus provided with a charging roller. More specifically, the present disclosure relates to an image forming apparatus in which a charging roller is capable of contacting with and separating from an image carrier.

Description of the Background Art

An image forming apparatus provided with a roller that can contact with and separate from an image carrier exists. Such an image forming apparatus includes an image former and a controller, and the controller controls the image former. The image former has an intermediate transfer belt serving as an image carrier, a secondary transfer roller, and a toner density detector, and a toner image is formed on a surface of the intermediate transfer belt. The secondary transfer roller can press against and separate from the surface of the intermediate transfer belt. The toner density detector detects the toner density of the toner image on the intermediate transfer belt after passing through the secondary transfer roller. The controller determines whether the secondary transfer roller is in a pressure contact state or a separate state on the basis of the toner density detected by the toner density detector, and toner density data included in the image data. Consequently, an image forming apparatus capable of detecting abnormality of the secondary transfer roller without delaying the operation of the image former is provided.

The above image forming apparatus determines a state in which the secondary transfer roller is separated from the intermediate transfer belt which is the image carrier, by detecting a toner image that is not secondarily transferred onto the paper, with an image density sensor. In other words, the image density sensor detects the toner image that is not secondarily transferred to the paper of a secondary transferrer in a state in which a toner image is previously formed on the image carrier, and the image density sensor cannot determine the separation of the roller that charges the image carrier like a charging roller. There is also no disclosure of a point of determining a roller contact and separation state when a process unit including a photoconductor drum and a charging roller is installed in the image forming apparatus or is replaced.

The present disclosure has been made in order to solve the above problem, and an object of the present disclosure is to provide an image forming apparatus that can reliably detect whether a charging roller is separated from a photoconductor drum even without a dedicated sensor when the image forming apparatus is installed or when a process unit including the photoconductor drum and the charging roller is replaced, that and can reliably inform an operator that the charging roller is not in contact with the photoconductor drum.

SUMMARY OF THE INVENTION

An image forming apparatus according to the present disclosure includes a photoconductor drum; a charging roller that charges a surface of the photoconductor drum, and is capable of contacting with and separating from the photoconductor drum by a contact and separation mechanism; a developer that forms a toner image on the surface of the photoconductor drum; an image detector that detects the toner image formed by the developer; a charge power supply that applies a bias voltage to the charging roller; a development power supply that applies a bias voltage to the developer; and a controller. The controller causes the charge power supply and the development power supply to output respective predetermined bias voltages for predetermined time, and is capable of executing a contact and separation determination mode in which a contact and separation state of the charging roller is determined based on whether or not a toner image is detected by the image detector after output of the respective bias voltages.

The contact and separation state of the charging roller with the photoconductor drum can be determined effectively by executing the contact and separation determination mode using the image detector without providing a dedicated sensor.

In the contact and separation determination mode, the controller preferably causes the development power supply to output a bias voltage lower than that during image formation, and causes the charge power supply to output the same bias voltage as that during image formation.

Consequently, it is possible to suppress the amount of toner consumed in a case where fogging development is caused (because of smaller potential difference compared to uncharged photoconductor drum). Additionally, it is possible to prevent occurrence of fogging development in a case where the charging roller is in contact.

In the contact and separation determination mode, the controller may cause the charge power supply to output a pre-charging bias voltage for predetermined time, and thereafter to output a first charging bias voltage lower than the pre-charging bias voltage, and may cause the development power supply to output a first developing bias voltage before the first charging bias voltage is applied.

The pre-charging bias voltage is made higher than the first charging bias voltage, so that it is possible to stabilize the potential of the surface of the photoconductor drum in a short time. Furthermore, the potential of the surface is stabilized, and therefore it is possible to reduce the amount of fogging toner.

When causing the charge power supply and the development power supply to output respective bias voltages, the controller preferably gradually changes the respective bias voltages to target bias voltages, or when causing the charge power supply and the development power supply to stop output, the controller preferably gradually reduces the output to 0.

When the charge power supply and the development power supply are caused to output the bias voltages, the bias voltages are gradually changed, so that it is possible to suppress local damage on the photoconductor drum.

The image detector may have a light emitter, and the controller may be capable of executing a development prevention mode (second mode) in which a bias voltage of the charge power supply is not output and the development power supply outputs a second developing bias voltage (reverse bias voltage) whose polarity is different from a bias voltage during image formation, the development prevention mode may be executed before execution of the contact and separation determination mode, and light intensity of the light emitter of the image detector may be adjusted during execution of the development prevention mode.

The development prevention mode (second mode) is executed before the contact and separation determination mode (first mode) is executed, so that it is possible to improve detection accuracy of an image with fogging development.

During the execution of the development prevention mode, in the color image forming apparatus, the probability of adherence of toner onto the intermediate transfer belt can be reduced because a situation in which the toner moves as little as possible onto the photoconductor drum is achieved. In other words, the intermediate transfer belt surface can be made clean and free of toner adhesion, and therefore it is possible to increase the adjustment accuracy of light intensity adjustment.

In an embodiment of the present disclosure, the image forming apparatus is a color image forming apparatus, and includes an intermediate transfer belt, a plurality of the charging rollers, a plurality of the photoconductor drums, and a plurality of the developers that are provided on an outer circumference of the intermediate transfer belt; intermediate transfer members that perform intermediate transfer of respective toner images formed on surfaces of the plurality of photoconductor drums onto the intermediate transfer belt; and intermediate transfer power supplies that apply bias voltages to the respective intermediate transfer members, wherein the image detector detects the toner images on the intermediate transfer belt, and in the contact and separation determination mode, the controller causes the charge power supply and the development power supply to output respective predetermined bias voltages to the plurality of charging rollers and the plurality of developers, and causes the intermediate transfer power supplies to output predetermined transfer bias voltages.

A fogging toner image on each photoconductor drum is actively transferred onto the intermediate transfer belt, so that the image detector can easily detect the image.

The controller may execute idling of rotating the intermediate transfer belt and the photoconductor drums for predetermined time by causing the development power supply to output a reverse bias voltage with a different polarity from a bias voltage output during image formation before execution of the contact and separation determination mode. By performing such a process, it is possible to prevent the toner from being developed from the development unit when a cleaner recovers residual toner remaining on the belt due to previous image forming operation, so that it is possible to reliably perform cleaning.

The controller may set applied time for applying a bias voltage to each of photoconductor drums in the contact and separation determination mode to time shorter than pitch/process speed (=belt rotational speed) of each the photoconductor drum, and sequentially may output a bias voltage to each of the photoconductor drums at a predetermined time interval to prevent overlapping transfer on the intermediate transfer belt.

Even in a state in which all the charging rollers are separated, the fogging toner images are transferred without overlapping on the belt, and therefore the separation state of the charging rollers can be reliably detected.

The controller may determine that the charging rollers are separated in a case where time during which the image detector detects an image is longer than 2 mm/process speed in the contact and separation determination mode.

In a case where there is a scratch on the surface of the intermediate transfer belt, the scratch is about 2 mm at the largest, and therefore it can be reliably determined that the charging roller is separated when the image is detected at 2 mm/process speed or more.

A process unit including the photoconductor drum and the charging roller may be provided, and the process unit may have a contact and separation mechanism capable of changing the charging roller between a separate position and a contact position with respect to the photoconductor drum.

Since the charging roller can be shipped in a state of separating from the photoconductor drum, and therefore even when the charging roller is left for a long period of time, it is possible to prevent deformation and deterioration of a surface elastic layer.

According to the present disclosure, it is possible to execute the contact and separation determination mode (first mode) in which a contact and separation state is determined using fogging development that forms an image when normal image forming operation is performed in a case where the charging roller is in a non-contact state, when the image forming apparatus is installed and when the process unit (unit including the charging roller and the photoconductor drum) is newly replaced, in order to check the contact state of the charging roller with the image density sensor provided in advance in the image forming apparatus. In a case where the image detector detects an image by executing the contact and separation determination mode, it can be determined that the photoconductor drum is not charged to the predetermined potential because the charging roller is separated, and an image is formed by fogging development due to the difference with the developing bias voltage.

Therefore, it is possible to provide an image forming apparatus in which an image density detector provided in advance can reliably detect a separate state without providing a dedicated sensor, and the non-contact state of the charging roller with the photoconductor drum can be reliably notified an operator, even when the charging roller is separated from the photoconductor drum when the image forming apparatus is installed or when the process unit is replaced with a new one.

The above object, other objects, features and advantages of the present disclosure will become clearer from the detailed description of the embodiments described below with reference to the drawings.

DESCRIPTION OF THE PREFERRED EMBODIMENTS

First Embodiment

Figure 1:
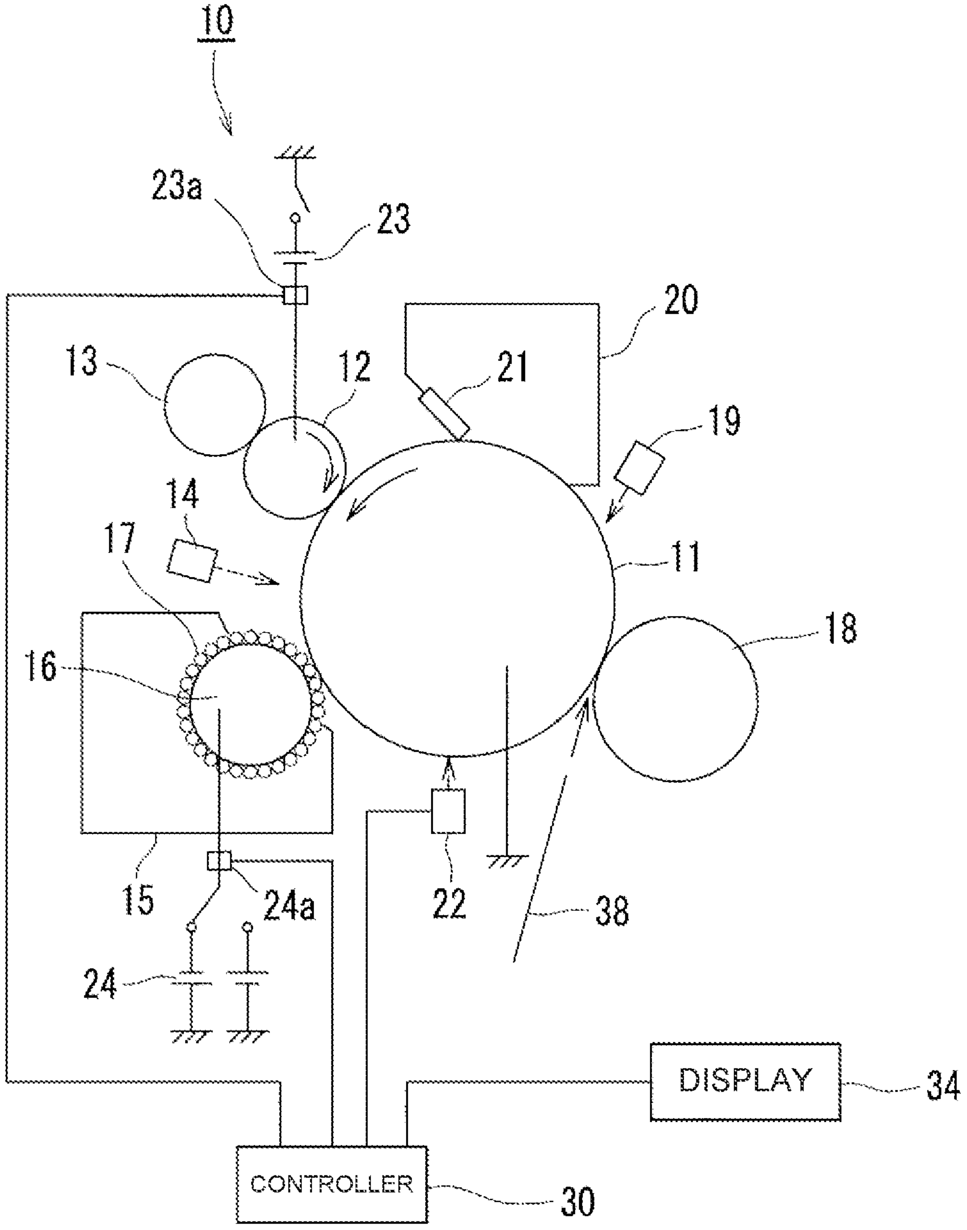
FIG. 1 is a configuration diagram of a periphery of a photoconductor drum having a process unit according to an embodiment of the present disclosure.

Hereinafter, embodiments of the present disclosure will be described with reference to the drawings. FIG. 1 is a diagram illustrating a configuration of a periphery of a charging roller 12 in a case where an image forming apparatus 10 (electrophotographic method) having a charging roller according to an embodiment of the present disclosure is a monochrome image forming apparatus, and illustrating a state in which toner (developer) 17 is transferred onto paper 38 via a photoconductor drum 11 and a transfer unit 18.

With reference to FIG. 1, the image forming apparatus 10 according to this embodiment includes the photoconductor drum 11 that is grounded and is formed with a toner image, the charging roller 12 that applies a predetermined first charging bias voltage to the photoconductor drum 11, an exposure unit 14 disposed on the downstream side of the charging roller 12, a development unit 15 disposed on the downstream side of the exposure unit 14, image density sensors (image detectors) 22 disposed on the downstream side of the development unit 15, and the transfer unit 18 that is disposed on the downstream side of the image density sensors 22 so as to come into contact with the photoconductor drum 11, and transfers a toner image on the photoconductor drum 11 to the paper 38 by rotating together with the photoconductor drum 11 and holding and transporting the paper 38. The transfer unit (transfer roller) 18 is connected to a plus power supply (not illustrated).

The charging roller 12 is connected to a charge power supply 23 subject to negative constant voltage control and is in contact with a cleaning roller 13. The development unit 15 includes a developing roller 16 that supplies developer (toner) 17 to the photoconductor drum 11, and the developing roller 16 is connected to a negative development power supply 24. (The developing roller 16 is also configured such that a so-called reverse bias voltage can be applied to the developing roller by a positive power supply provided to the right of the development power supply 24 by switching a switching switch.) A static elimination unit 19 that removes potential from the photoconductor drum 11 is provided on the downstream of the transfer unit 18, and a waste toner recoverer 20 and a cleaning blade 21 are provided on the downstream side of the static elimination unit 19. Each image density sensor 22 is used to adjust the ambient environment of the image forming apparatus 10 and the power supply conditions and the like supplied from the development power supply 24 to the developing roller 16 in order to always form stable toner images even when the number of images formed (increased usage time) increases. Specifically, the image density of the toner image on the photoconductor drum 11 obtained by changing the power supply condition supplied to the developing roller 16 is detected, and the power supply condition and the like supplied to the developing roller 16 are changed to optimize the image density.

In this embodiment, there is a characteristic of executing a contact and separation determination mode (first mode) for determining a contact and separation state in which a toner image is formed in a case where the charging roller 12 is in a non-contact state and no toner image is formed in a case where the charging roller 12 is in a contact state when the image forming apparatus 10 is installed and when the process unit (unit including the photoconductor drum 11 and the charging roller 12) is newly replaced, in order to check a state of contact between the photoconductor drum 11 and the charging roller 12 with the image density sensors 22 provided in advance by the image forming apparatus 10. Therefore, this point will be now described.

Essentially, as described with reference to FIG. 1, when the photoconductor drum 11 and the charging roller 12 are in contact, the photoconductor drum 11 is uniformly charged to a predetermined potential via the charging roller 12, potential is reduced and an electrostatic latent image is formed in an area exposed by the exposure unit 14 in accordance with a printed image. Then, toner 17 charged in an electrostatic latent image portion from the developing roller 16 is electrically supplied by the developing bias voltage and is developed as a toner image. Therefore, the image density sensors 22 detect density information corresponding to the density of the toner image. In other words, the image density sensors 22 detect the toner image. However, in a case where no exposure is performed by the exposure unit 14, no electrostatic latent image is formed (no or small potential difference between the developing roller 16 to which the developing bias is applied), and therefore no toner 17 is supplied from the developing roller 16 and no toner image is formed. Therefore, the image density sensors 22 do not detect any toner image. In other words, a value according to a surface condition of the photoconductor drum 11 itself, that is, a bare surface condition (no toner) is detected. (The value set during the light intensity adjustment described below is itself detected.) On the other hand, when the photoconductor drum 11 and the charging roller 12 are separated, the photoconductor drum 11 is not uniformly charged to a predetermined potential through the charging roller 12. Therefore, when a developing bias voltage is applied to the developing roller 16, a large potential difference is generated between the developing roller 16 and the photoconductor drum 11, and an image is formed by so-called fogging development in which a large amount of toner 17 electrically moves onto the photoconductor drum 11 (in all areas corresponding to the developing roller 16). The toner moved onto the photoconductor drum 11 by this fogging development can be detected by the image density sensors 22. In other words, the contact and separation between the photoconductor drum 11 and the charging roller 12 can be determined.

To make such determination, a controller 30 is provided as illustrated in FIG. 1. The controller 30 is connected to a charge power supply controller 23*a* that controls a voltage applied to a charge power supply 23, a development power supply controller 24*a* that controls a voltage applied to the development power supply 24, the image density sensor 22, and a display 34 that indicates that the charging roller is not in contact with the photoconductor drum, and the like. The controller 30 includes a CPU, a memory, and the like, and controls the entire image forming apparatus 10.

The following is a specific description. In the image forming apparatus 10 according to the embodiment of this disclosure, it is possible to execute a contact and separation determination mode (first mode) of determining a contact and separation state in which a toner image is formed in a case where the charging roller 12 is in non-contact with the photoconductor drum 11 and no toner image is formed in a case where the charging roller 12 is in contact the photoconductor drum 11. In a case where the image density sensors 22 detect an image by executing the contact and separation determination mode, it can be determined that the photoconductor drum 11 is not charged to the predetermined potential because the charging roller 12 is separated from the photoconductor drum 11, and an image is formed by fogging development due to the difference with the developing bias voltage.

Figure 2:
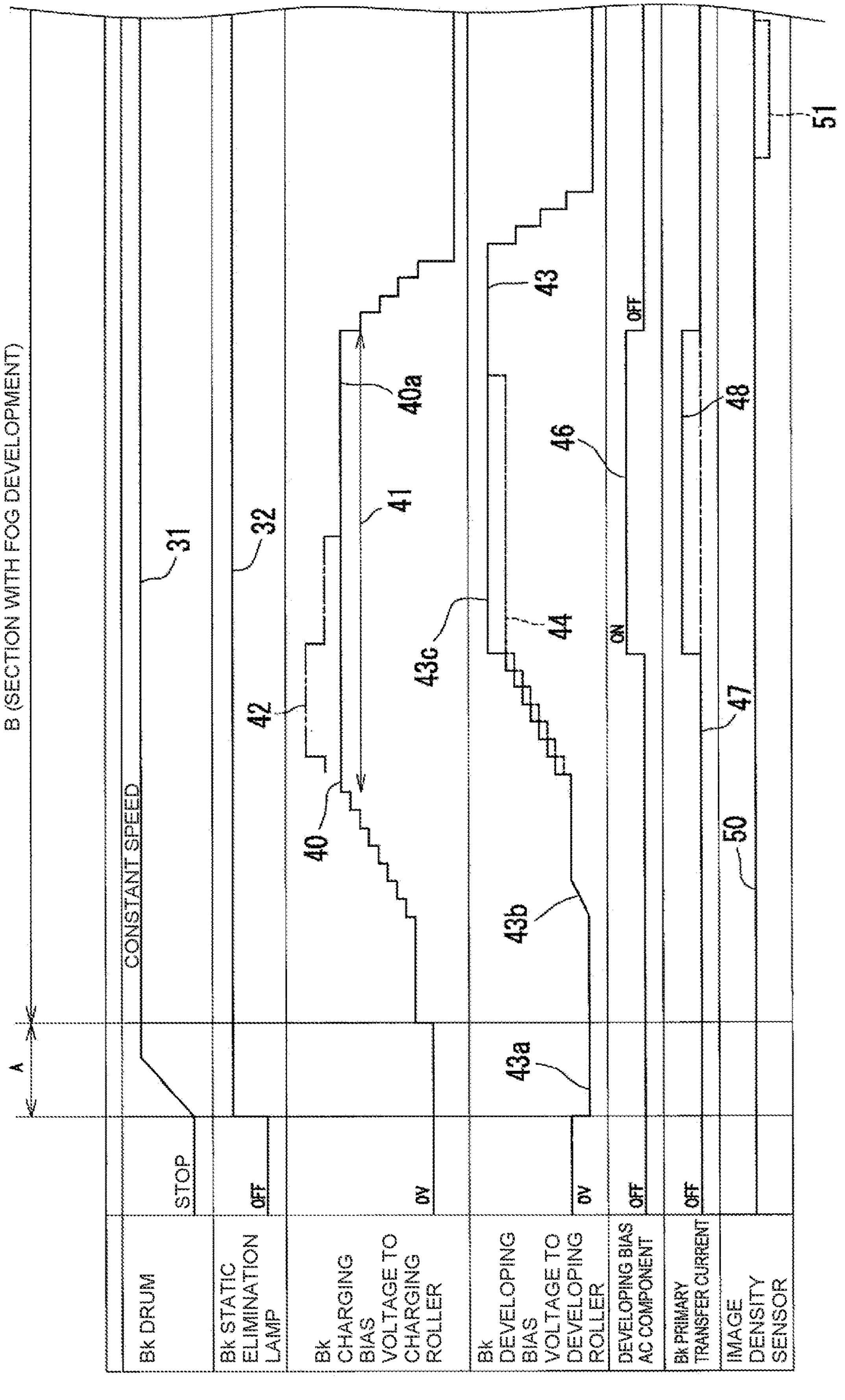
FIG. 2 is a time chart illustrating a charging bias voltage and the like in a section with fogging development necessary to determine separation (separation determination mode (first mode)).

FIG. 2 is a time chart illustrating signals and voltages of the photoconductor drum 11, the charging roller 12, and the like in "(B) section with fogging development" in which the above first mode is executed, in a monochrome image forming apparatus according to the embodiment of the present disclosure. The reason why the "(B) section with fogging development" is indicated herein is that "(A) section without fogging development" exists before the "(B) section with fogging development," as described later.

With reference to FIG. 2, the time chart of the "(B) section with fogging development" in this embodiment illustrates a motor rotation signal 31 of the black (Bk) photoconductor drum (photoconductor drum 11), an ON/OFF signal 32 of a black (Bk) static elimination lamp, a charging bias voltage 40 to the charging roller 12, a developing bias voltage 43 applied to the developing roller, an ON/OFF signal 46 of the developing bias voltage AC component, an ON/OFF signal 47 of a primary transfer current of the photoconductor drum (Bk), and a signal 50 indicating the presence or absence of image detection by the image density sensors 22.

The reason why the "photoconductor drum 11" of the monochrome image forming apparatus is indicated herein as the "black (Bk) photoconductor drum" is that consistency with a color image forming apparatus which will be described later is considered.

The motor rotation signal 31 of the black (Bk) photoconductor drum is initially stopped, but indicates that the black (Bk) photoconductor drum rotates at a constant speed in the "(B) section with fogging development".

The ON/OFF signal 32 of the black (Bk) static elimination lamp is ON in the "(B) section with fogging development".

Now, the time chart of the charging bias voltage 40 applied to the charging roller 12 and the developing bias voltage 43 applied to the developing roller 16 will be described. In the time chart, the charging bias voltage 40 is a DC component of the charging bias voltage and the developing bias voltage 43 is a DC component of the developing bias voltage.

Returning to FIG. 1, when the photoconductor drum 11 rotates to reach a position of the charging roller 12, the photoconductor drum 11 is uniformly charged to predetermined potential by the charging roller 12 to which the charging bias voltage 40 is applied. The charging bias voltage 40 is referred to as the first charging bias voltage in the (B) section with fogging development, and is indicated by the first charging bias voltage 40*a* in FIG. 2, and a voltage ranging from −50 V to −1000 V is applied to the charging bias voltage 40 at the time of ON. This charging bias voltage 40 is 0 V in the "(A) section without fogging development" described later, but becomes −50 V when entering the "(B) section with fogging development," and then the applied voltage is raised in a stepwise manner to about −600 V. Thereafter, the applied voltage is maintained for charging roller contact and separation check time 41, and then lowered to 0 V in a stepwise manner. This −600 V is the same voltage value applied to the charging roller 12 during image forming operation.

On the other hand, when the photoconductor drum 11 rotates and comes to the position of the developing roller 16, the developing bias voltage of 43 is applied to the developing roller 16. This developing bias voltage 43 is called a first developing bias voltage 43*c* in the (B) section with fogging development, and a voltage in the range of 0 to −600 V is applied at the time of ON. Thus, in this time chart, the chart is based on movement of a position on the photoconductor drum 11, and timing at which the first charging bias voltage 40*a* is applied is not the same as the timing at which the first developing bias voltage 43*c* is applied to the developing roller 16. In the contact and separation determination mode (including the (B) section with fogging development), exposure operation by the exposure unit 14 is not performed.

A so-called reverse bias voltage (+100 V, a second developing bias voltage in this embodiment) on the positive side is applied to this developing bias voltage 43 before entering the "(B) section with fogging development" (illustrated by 43*a* in the figure). Thereafter, as illustrated by 43*b* in the figure, the developing bias voltage 43 is linearly increased and maintained for a certain period of time. After that, the applied voltage is raised in a stepwise manner to the first developing bias voltage 43*c* which is about −200 V (predetermined voltage), is maintained for a certain period of time, and then is lowered in a stepwise manner to +100 V which is the original reverse bias voltage. As described in detail below, when the charging roller 12 is separated from the photoconductor drum 11, fogging development is performed during the time when the first developing bias voltage 43*c* is applied.

As described above, when the controller 30 outputs the bias voltage to the charge power supply 23 and the development power supply 24, the controller 30 changes the bias voltage to a target bias voltage. When the output is stopped, the output is gradually reduced to zero. Thus, local damage to the photoconductor drum 11 can be suppressed by gradually changing the bias voltage.

Herein, when the first charging bias voltage 40*a* is applied up to −600 V, the photoconductor drum 11 is finally uniformly charged at a value close to −600 V to enable creation of an electrostatic latent image. However, when the charging roller 12 is separated from the photoconductor drum 11, the photoconductor drum 11 is not charged. In other words, when the charging roller 12 is separated from the photoconductor drum 11, the first developing bias voltage 43*c* (e.g., about −200 V which is the voltage value applied during image formation) is applied to the developing roller 16 in a state in which the photoconductor drum 11 is not charged. Therefore, the toner 17 moves electrically to the photoconductor drum 11 due to the potential difference, and the toner 17 adheres to a surface of the photoconductor drum 11 during the time when the first developing bias voltage 43*c* is applied.

Furthermore, in this embodiment, the controller 30 may cause the development power supply 24 to output the bias voltage lower than a voltage during image formation, and causes the charge power supply 23 to output the same bias voltage as the voltage during image formation, as illustrated by the dotted line 44 in the figure, in the contact and separation determination mode (including the (b) section with fogging development).

Consequently, it is possible to suppress the amount of the toner 17 consumed in a case where fogging development is caused (because of smaller potential difference compared to the uncharged photoconductor drum 11).

The pre-charging bias voltage (indicated by a dashed line) 42, which is higher than the first charging bias voltage 40*a*, is also illustrated herein to raise the potential of the Bk1 photoconductor drum 11 more quickly. The pre-charging bias voltage 42 is lowered to the voltage of the first charging bias voltage 40*a* in a stepwise manner. However, this timing comes after the first developing bias voltage 43*c* reaches the highest voltage indicated by a solid line.

In other words, in this embodiment, in the contact and separation determination mode, the controller 30 causes the charge power supply 23 to output the pre-charging bias voltage 42 for a predetermined time, then outputs the first charging bias voltage 40*a* lower than the pre-charging bias voltage 42, and causes the development power supply 24 to output the first developing bias voltage 43 before the first charging bias voltage 40*a* is applied.

The pre-charging bias voltage 42 is made higher than the first charging bias voltage 40*a*, so that it is possible to stabilize the potential of the surface of the photoconductor drum 11 in a short time. Furthermore, the potential of the surface is stabilized, and therefore it is possible to reduce the amount of fogging toner.

Now, the ON/OFF signal 46 for the developing bias voltage AC component, which is indicated under the developing bias voltage, will be described. This signal is initially OFF, but turns ON when the first developing bias voltage 43 reaches a certain voltage, and turns OFF when the first charging bias voltage 40*a* starts falling.

The ON/OFF signal 47 for the primary transfer current of the photoconductor drum (Bk), which is indicated under the ON/OFF signal 46, is initially 0 V like the ON/OFF signal 46 of the developing bias voltage AC component, but turns ON when the developing bias voltage 43 reaches a certain voltage and turns OFF when the first charging bias voltage 40*a* starts falling.

Now, the signal 50 indicating the presence or absence of image detection by the image density sensors 22, which are indicated under the ON/OFF signal 47, will be described. This signal 50 indicates the presence or absence of image detection. When the charging roller 12 is in contact with the photoconductor drum 11, there is no change (indicated by a solid line in the figure) because no fogging development is caused.

In contrast, when the charging roller 12 is separated from the photoconductor drum 11, an image with fogging development is formed, and the image density sensors 22 detect this (indicated by a dotted line 51 in the figure). The reason why this signal is detected after the section with fogging development is terminated is because the image density sensors 22 are located on the downstream side away from the developing roller 16, as illustrated in FIG. 1.

Figure 3:
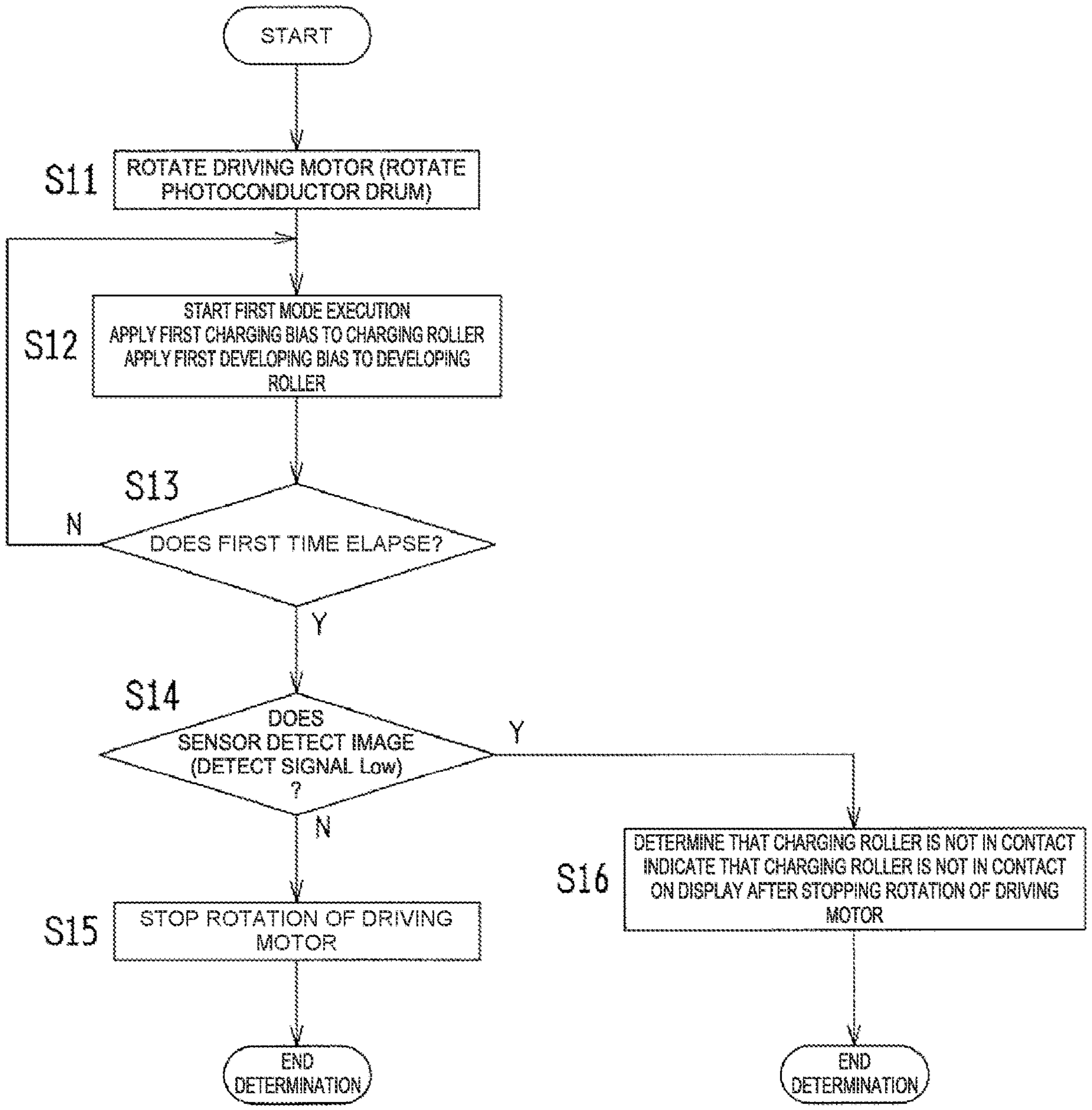
FIG. 3 is a flowchart illustrating a separation determination method in the first mode.

Now, the aforementioned contact and separation determination mode performed by the controller 30 will be described with reference to flowchart. FIG. 3 is a flowchart illustrating a process content of the contact and separation determination mode, which is implemented when the process unit is replaced with a new one.

With reference to FIG. 3, the CPU of the controller 30 first rotates the driving motor (not illustrated) and rotates the photoconductor drum 11 (Step S11, Steps will be omitted below) to execute the first mode. Specifically, a first charging bias voltage is applied to the charging roller 12 and a first developing bias voltage is applied to the developing roller 16 (S12). It is determined whether the first time elapses (S13), and when the first time elapses (Y in S13), it is determined whether the image density sensors 22 detect an image (signal Low 51 in FIG. 2) (S14).

Herein, the first time is the charging roller contact and separation check time required to cause a band-shaped image by fogging development formed on the photoconductor drum 11 to reach the image density sensors 22. When the first time does not elapse in S13 (N in S13), the process returns to S12. As described above, the exposure unit 14 is not operated.

When the image density sensors 22 do not detect the image (signal Low) in S14 (N in S14), the controller 30 determines that the charging roller 12 is in contact with the photoconductor drum 11, stops the driving motor, and then ends the process (S15).

When the image density sensors 22 detect the image (signal Low) in S14 (Y in S14), the controller 30 stops the driving motor as the reason that the charging roller 12 is not in contact with the photoconductor drum 11, and then indicates that the charging roller 12 is not in contact with the photoconductor drum 11, on the display 34 (S16).

As described above, in this embodiment, the developing bias voltage and the charging bias voltage are controlled to create the section with fogging development in which fogging development is caused, and the image density sensors 22 detect a fogging patch (signal Low 51 in FIG. 2), which is a toner image formed only when the charging roller 12 is separated from the roller. Consequently, it is possible to confirm that the charging roller 12 is in a separate (trouble) state.

As a result, it is possible to effectively determine the state of contact and separation of the charging roller 12 with and from the photoconductor drum 11 by execution of the contact and separation determination mode using the existing image density sensors 22 even when an ammeter or a dedicated sensor is provided.

Figure 4A:
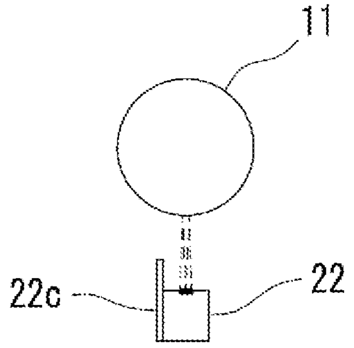
FIG. 4A is a diagram illustrating an image density sensor.
Figure 4B:
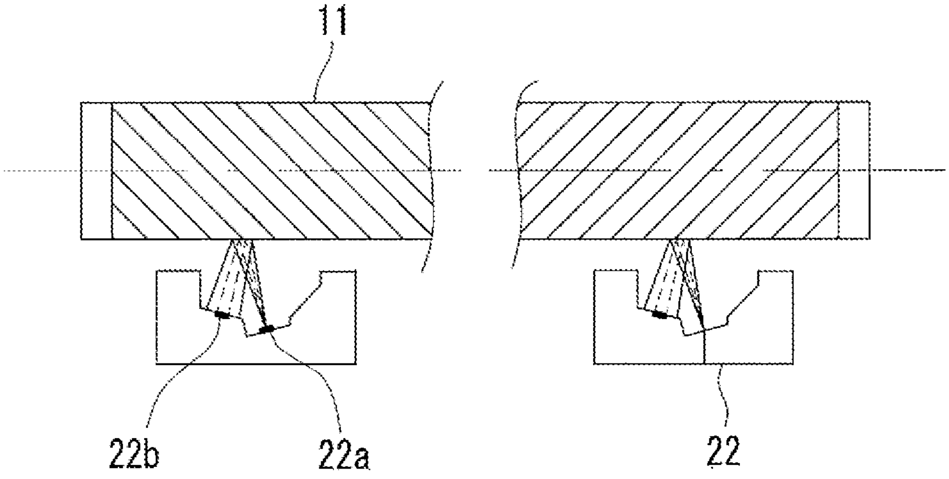
FIG. 4B is a diagram illustrating image density sensors.

Now, the image density sensors 22 will be described. FIG. 4A illustrates the image density sensor 22 provided at the bottom of the photoconductor drum 11, viewed from the axial direction of the photoconductor drum 11, and FIG. 4B illustrates the image density sensors 22 provided at the bottom of the photoconductor drum 11, viewed from the longitudinal direction of the photoconductor drum 11. With reference to FIG. 4A and FIG. 4B, each image density sensor 22 is rectangular viewed from the axial direction of the photoconductor drum 11, has a sensor mounting part 22*c* on one side, and the two image density sensors 22 are provided along the longitudinal direction of the photoconductor drum 11.

Each image density sensor 22 has a recess along the longitudinal direction of the photoconductor drum 11. The photoconductor drum 11 is irradiated with light from the light emitter 22*a* in the center of the image density sensor 22, and reflected light from the photoconductor drum 11 is received by the light receiver 22*b* to detect an image on the photoconductor drum 11. Herein, when the photoconductor drum 11 is new, its surface is a mirror surface. Therefore, when light is irradiated from a light emitter 22*a* to the photoconductor drum 11 and the reflected light is received by a light receiver 22*b*, about 3 V is obtained, for example. However, after use for a long time, the surface deteriorates and the voltage drops to 0.5 V to 1.0 V, for example. Therefore, when the process unit is replaced, it is necessary to adjust the light intensity of the light emitter of each image density sensor 22.

Figure 5A:
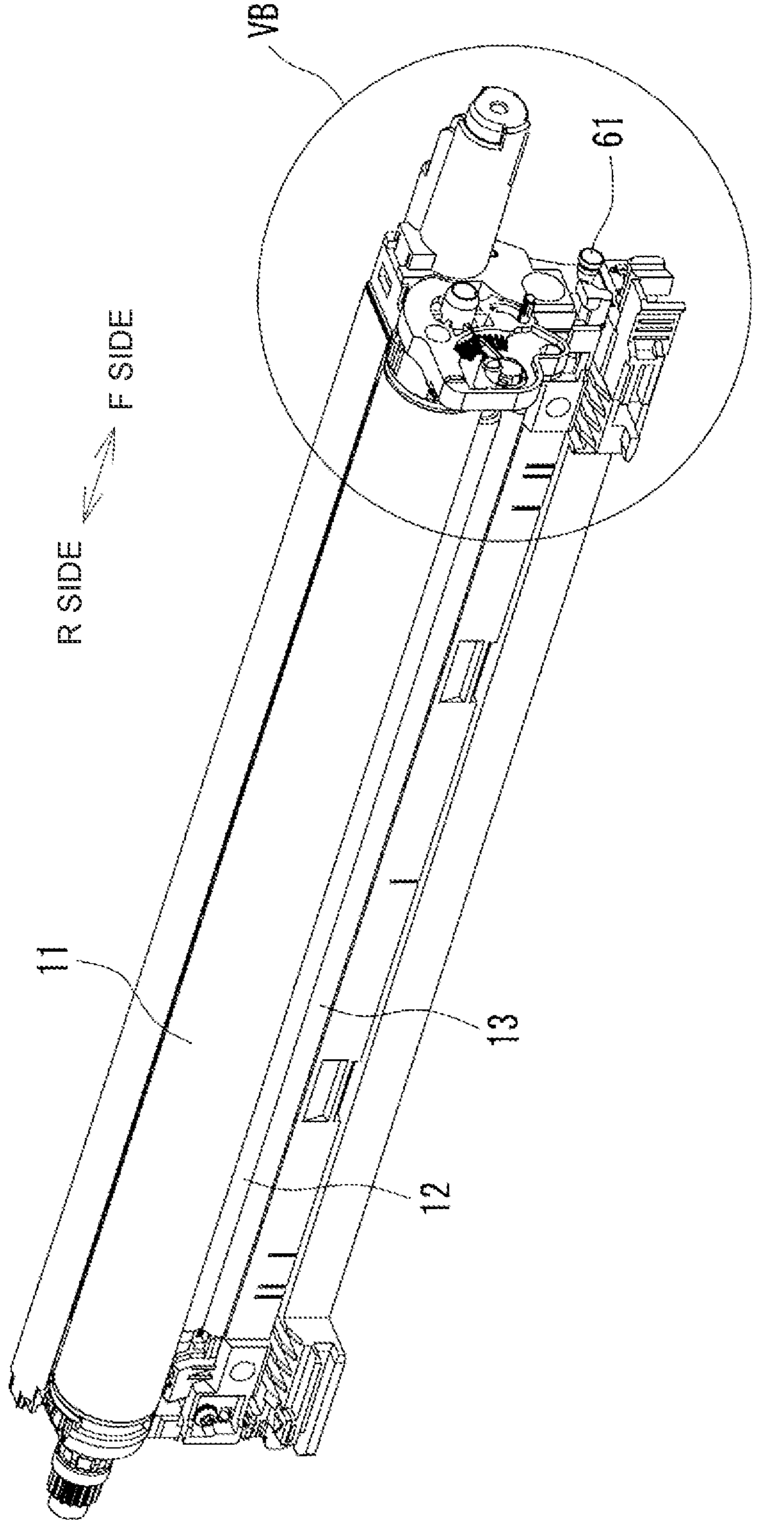
FIG. 5A is a diagram illustrating a mechanism that brings a charging roller into contact with a photoconductor drum.

Now, a contact mechanism that brings the charging roller 12 into contact with the photoconductor drum 11, which is the premise of this disclosure, will be described. FIG. 5A to FIG. 5C, and FIG. 6 are diagrams for illustrating the contact mechanism. FIG. 5A is a perspective view of the process unit attached to the image forming apparatus 10.

FIG. 5A illustrates the photoconductor drum 11, the charging roller 12, and the cleaning roller 13. In the figure, the front side is the front (F) side, the rear side is the rear (R) side, and a gear protrudes on the R side. This gear engages a driver having a driving motor (not illustrated) provided in a main body (not illustrated)) of the image forming apparatus 10. The process unit is also provided with a knob 61 that is connected (integrally formed) to a locking member 36 (see FIG. 6) that engages a claw 35 on a bearing that supports the charging roller 12 on its shaft to bring the charging roller 12 into contact (contact) with the photoconductor drum 11.

Figure 5B:
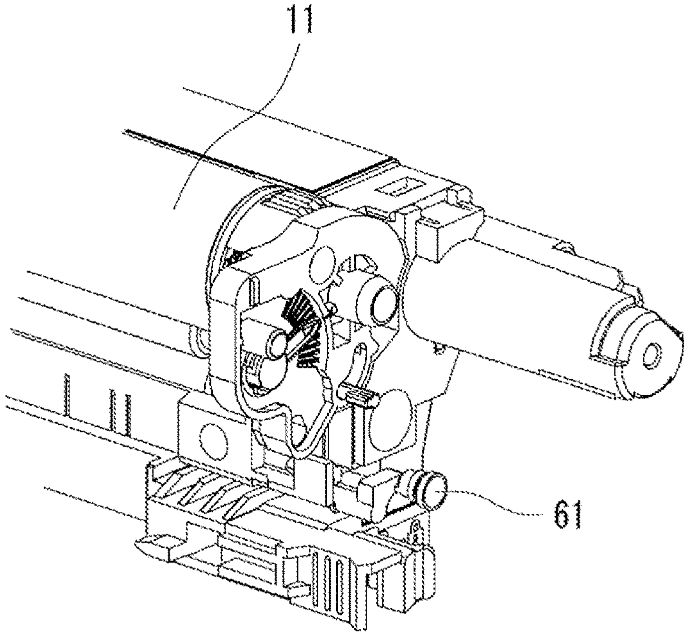
FIG. 5B is a diagram illustrating the mechanism that brings the charging roller into contact with the photoconductor drum.
Figure 5C:
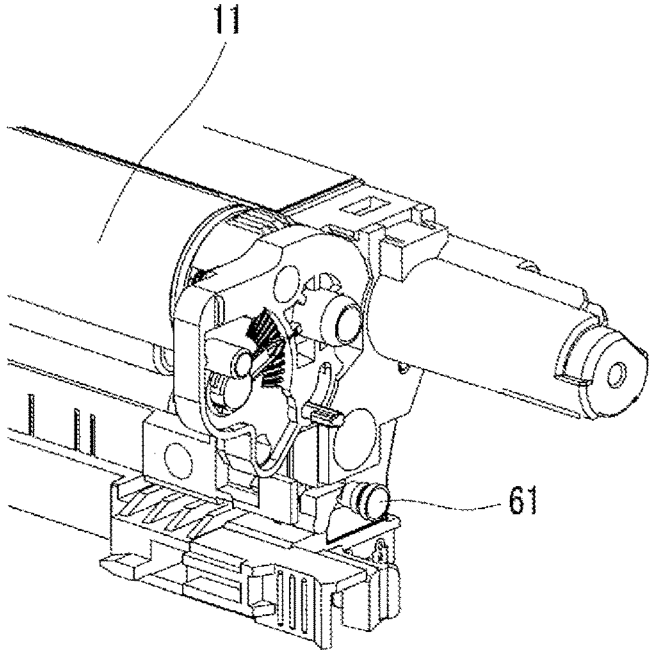
FIG. 5C is a diagram illustrating the mechanism that brings the charging roller into contact with the photoconductor drum.

FIG. 5B is an enlarged view of an area indicated by a circled portion (VB) in FIG. 5A, illustrating the state in which the knob 61 is pulled out (charging roller separated state), and FIG. 5C is an enlarged view of the area indicated by a circled portion (VB) in FIG. 5A, illustrating the state in which the knob 61 is pushed in (charging roller contact state) FIG. 5C is an enlarged view of the area indicated by a circled portion (VB) in FIG. 5A.

Figure 6:
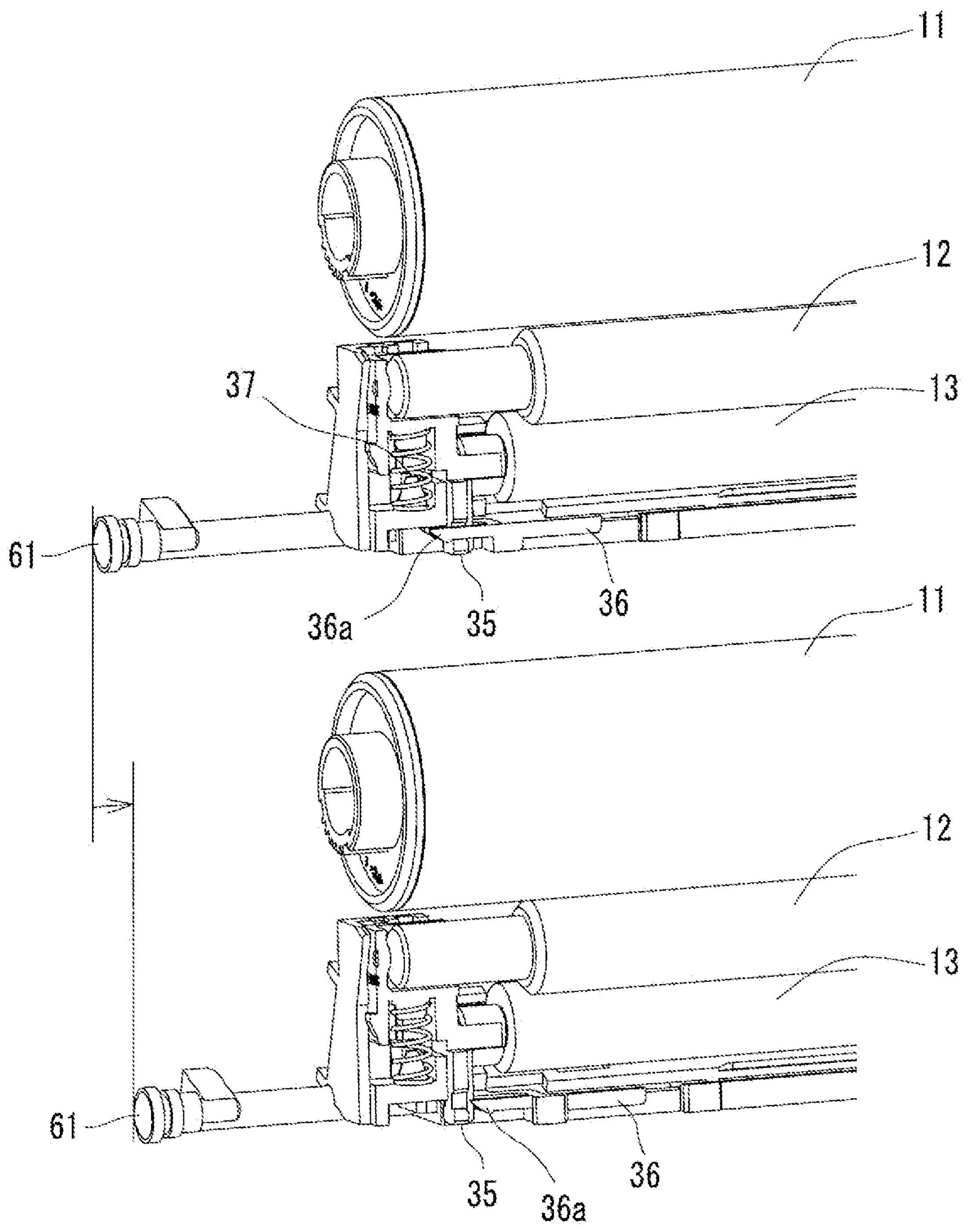
FIG. 6 is a diagram illustrating the mechanism that brings the charging roller into contact with the photoconductor drum.

FIG. 6 is a diagram illustrating a state in which an operator brings the photoconductor drum 11 and the charging roller 12 into contact with each other during installation. The top of FIG. 6 illustrates a separate state in which the knob 61 is withdrawn, and the bottom of FIG. 6 illustrates a contact state in which the knob 61 is pushed in, as indicated by an arrow in the figure.

As illustrated in the top of FIG. 6, there is a gap between the photoconductor drum 11 and the charging roller 12, because the photoconductor drum 11 and the charging roller 12 are shipped in a separated state. Consequently, it is possible to prevent deformation and deterioration of a surface elastic layer when the charging roller 12 is left for a long period of time.

When the photoconductor drum 11 and the charging roller 12 are brought into contact with each other, the knob 61 is pushed in, as illustrated in the bottom of FIG. 6. As illustrated in the top of FIG. 6, the charging roller 12 and the cleaning roller 13 are held by one bearing. When the knob 61 is pushed in from the state where the charging roller 12 is separated, a locking portion 36*a* of the locking member 36 integrally provided with the knob 61 is pushed out from an engagement position with the claw 35 provided on the bearing, and the state of the engagement with the claw 35 is released, and therefore a biasing member 37 pushes up the charging roller 12 and the charging roller 12 comes into contact with the photoconductor drum 11.

Figure 7:
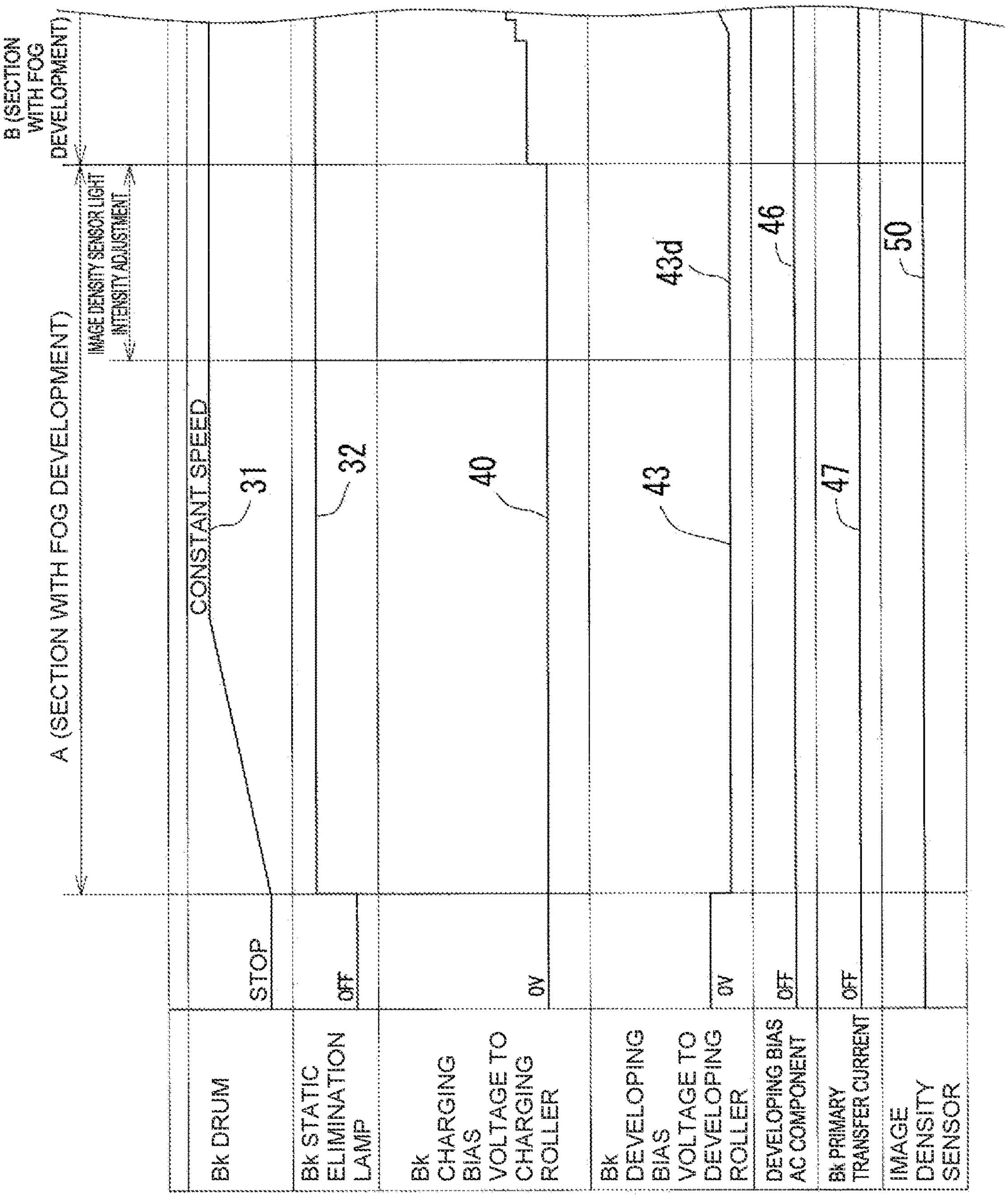
FIG. 7 is a time chart illustrating a charging bias voltage and the like in a section without fogging development (development prevention mode (second mode)) before the section with fogging development.

Now, the section before the "(B) section with fogging development" illustrated in FIG. 2, the "(A) section without fogging development" will be described. FIG. 7 is a time chart illustrating details of "(A) section without fogging development", and illustrates the motor rotation signal 31 of the black (Bk) photoconductor drum, the ON/OFF signal 32 of the black (Bk) static elimination lamp, the charging bias voltage 40 to the charging roller 12, the developing bias voltage 43 applied to the developing roller, the ON/OFF signal 46 of the developing bias voltage AC component, the ON/OFF signal 47 of a primary transfer current of the photoconductor drum (Bk), and the signal 50 indicating the presence or absence of image detection by the image density sensors 22, from the top, as well as the time chart of the "(B) section with fogging development".

This "(A) section without fogging development" has "adjustment section of light intensity of the image density sensor 22 before the "(B) section with fogging development" illustrated in FIG. 2. As mentioned above, this section is a necessary process when the process unit is replaced, and therefore is provided before the "(B) section with fogging development".

With reference to FIG. 7, the motor rotation signal 31 of the black (Bk) photoconductor drum is initially stopped, but in the "(A) section without fogging development," the driving motor is accelerated to linearly increase speed and rotates at a constant speed in a predetermined time, and then continues through the light intensity adjustment section to the "(B) section with fogging development" as already described.

The ON/OFF signal 32 of the black (Bk) static elimination lamp, which is under the black (Bk) photoconductor drum motor rotation signal 31, is initially OFF, but turns ON upon entering the "(A) section without fogging development" and remains ON continuously into the "(B) section with fogging development".

Now, the time chart of the charging bias voltage 40 to the charging roller 12 and the developing bias voltage 43 to the developing roller 16 will be described.

The charging bias voltage 40 to the charging roller 12 is initially 0 V in the "(A) section without fogging development".

On the other hand, the developing bias voltage 43 applied to the developing roller 16 is initially 0 V, but when the developing bias voltage enters in the "(B) section without fogging development", a reverse bias voltage of 100 V is applied to the developing bias voltage 43, and this voltage is maintained during the "(A) section without fogging development".

In other words, the controller 30 can execute the development prevention mode (second mode) in which the charging bias voltage 40 of the charge power supply 23 is not output and the development power supply 24 outputs a second developing bias voltage (reverse bias voltage) whose polarity is different from that during image formation. The development prevention mode is executed before the execution of the contact and separation determination mode, and the light intensity of the light emitter of the image density sensor 22 is adjusted during the execution of the development prevention mode.

The development prevention mode (second mode) is executed before the contact and separation determination mode (first mode), so that it is possible to improve detection accuracy of an image with fogging development.

Now, the ON/OFF signal 46 for the developing bias voltage AC component, which is indicated under the developing bias voltage, will be described. This signal is initially OFF, and maintained in the "(A) section without fogging development".

The ON/OFF signal 47 for the primary transfer current of the photoconductor drum (Bk), which is indicated under the ON/OFF signal 46, is also initially OFF, and is maintained in the “(A) section without fogging development”.

Now, the signal 50 indicating the presence or absence of image detection by the image density sensors 22, which are indicated under the ON/OFF signal 47, will be described. This signal 50 is also initially OFF, and is maintained in the “(A) section without fogging development”.

Figure 8:
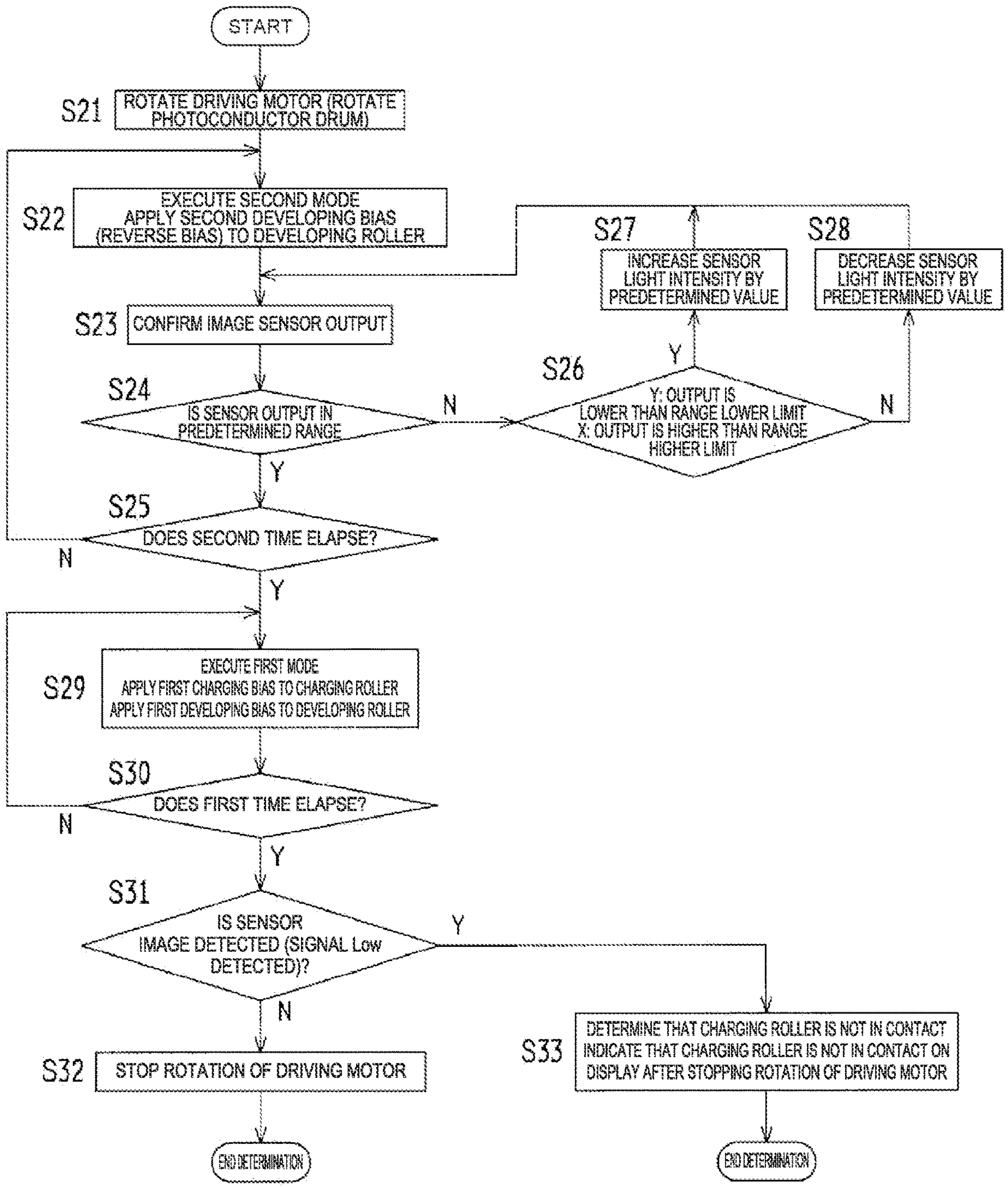
FIG. 8 is a flowchart illustrating a determination method in the second mode.

Now, the contact and separation determination mode performed by the controller 30 in the “(A) section without fogging development” before the “(B) section with fogging development” will be described with reference to a flowchart. FIG. 8 is a flowchart illustrating a process content of the contact and separation determination mode, which is implemented when the process unit is replaced with a new one.

With reference to FIG. 8, the controller 30 first rotates the driving motor (not illustrated) and rotates the photoconductor drum 11 (Step S21, Steps will be omitted below) to execute the development prevention mode (second mode). Specifically, a second developing bias voltage (reverse bias voltage) is applied to the developing roller 16 such that toner is not attracted to the photoconductor drum 11 (S22). Now, since the photoconductor drum 11 is new, the light intensity of the light emitter of the image density sensor 22 is adjusted. Specifically, output of the image density sensor 22 is checked (S23), and whether or not the output of the image density sensor 22 is within a predetermined range (e.g., 3 V or more) is determined (S24). When the output of the image density sensor 22 is within the predetermined range in S24 (Y in S24), it is determined whether or not predetermined second time (time required to adjust the light intensity of the image density sensor 22) elapses (S25).

When the output of the image density sensor 22 is outside the predetermined range in S24 (N in S24), whether the output of the image density sensor 22 is lower than the lower limit of the predetermined range or whether the output is higher than the upper limit of the predetermined range (S26). When the output is lower than the lower limit of the predetermined range, the sensor light intensity is increased by a predetermined value (S27), and when the output is higher than the upper limit of the predetermined range, the sensor light intensity is decreased by a predetermined value (DOWN) (S28) and the process returns to S23.

When the predetermined second time elapses in S25 (Y in S25), the first mode is executed (S29). Specifically, a first charging bias voltage is applied to the charging roller 12 and a first developing bias voltage is applied to the developing roller 16. Thereafter, it is determined whether or not the first time elapses (S30), and when the first time elapses (Y in S30), it is determined whether or not the image density sensor 22 detects an image (S31). When the image density sensor 22 detects an image in S31 (Y in S31), it is determined that the charging roller 12 is not in contact with the photoconductor drum 11, the rotation of the drive motor is stopped, and thereafter it is indicated on the display 34 that the charging roller 12 is not in contact with the photoconductor drum 11.

When the image density sensor 22 does not detect an image in S31 (N in S31), the rotation of the driving motor is stopped and the process ends. When the first time does not elapse in S30 (N in S30), the process returns to S29.

Second Embodiment

Now, other embodiment of the disclosure will be described. In the above embodiment, the case where this disclosure is applied to an image forming apparatus 10 which is a monochrome image forming apparatus is described, but the case where this disclosure is applied to a color image forming apparatus will be described below.

Figure 9:
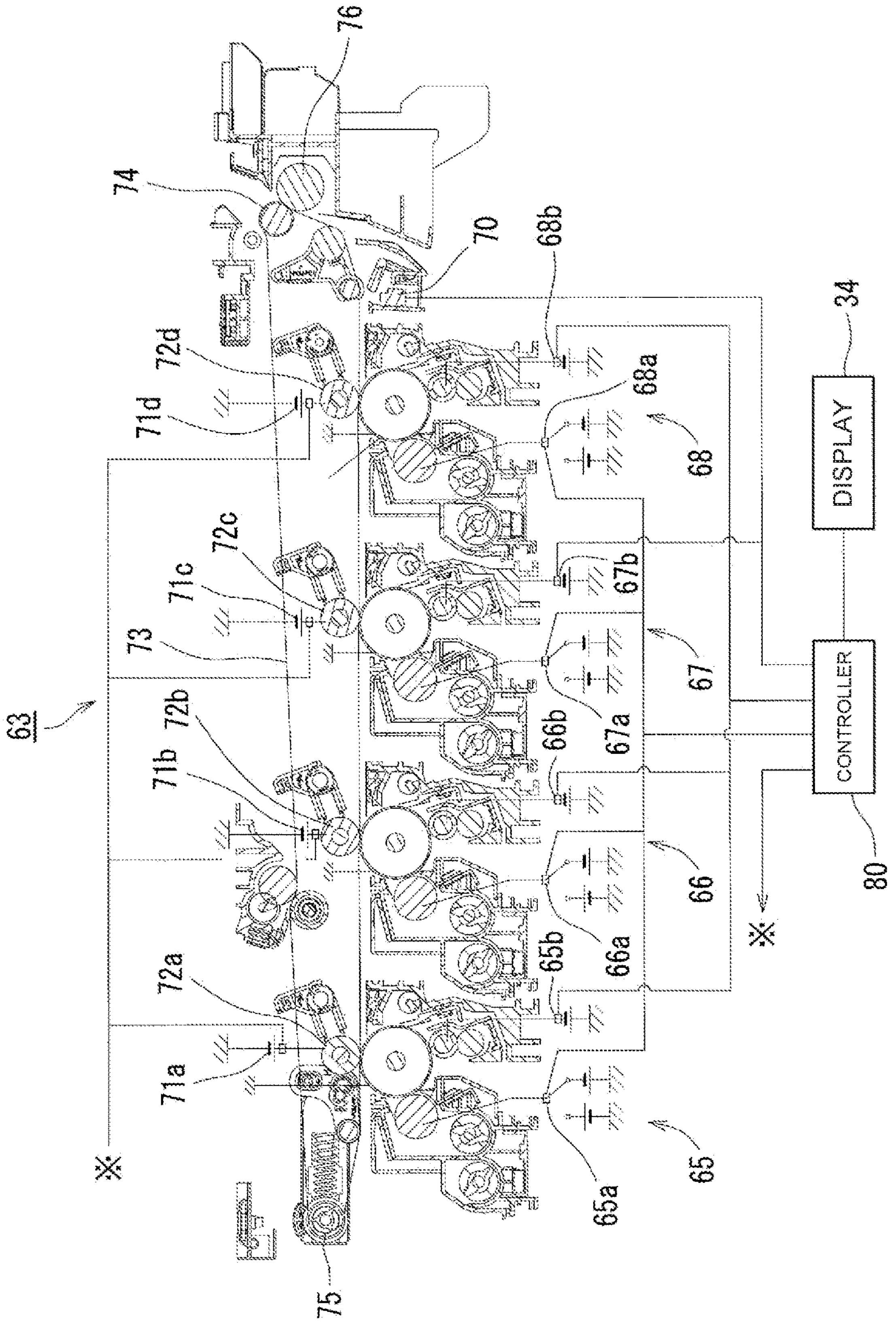
FIG. 9 is a configuration diagram of a periphery of a transferrer having a process unit in a color image forming apparatus.

FIG. 9 is a diagram corresponding to FIG. 1 in the previous embodiment, when the image forming apparatus 10 applies this disclosure to a color image forming apparatus 63. In this embodiment, with reference to FIG. 9, the color image forming apparatus 63 includes a yellow (Y) image former 65, a magenta (M) image former 66, a cyan (C) image former 67, and a black (K) image former 68. Like the monochrome image forming apparatus illustrated in FIG. 1, the respective image formers 65 to 68 are provided with four units that form respective four different toner images for colors, and include photoconductor drums, charging rollers, charge power supply controllers 65*b* to 68*b*, development power supply controllers 65*a* to 68*a*, and the like.

Respective toner images of colors formed by the respective image formers 65 to 68 are transferred to an intermediate transfer belt 73 via the respective intermediate transfer rollers 72*a* to 72*d* (intermediate transfer members, which are provided in the image formers 65 to 68 respectively) to form color toner images on the intermediate transfer belt 73. In order to transfer the color toner images onto the intermediate transfer belt 73, the intermediate transfer rollers 72*a* to 72*d* are provided with an intermediate transfer power supply 71*a* to 71*d*, each of which applies a bias voltage to each intermediate transfer member.

A nip is formed between the intermediate transfer belt 73 and a secondary transfer roller 76, and a color toner image on a surface of the intermediate transfer belt 73 is transferred onto paper while the paper (not illustrated) is nipped in this nip and transported.

As illustrated in FIG. 9, the color image forming apparatus 63 is also provided with a controller 80 as in FIG. 1. The controller 80 is connected to the development power supply controllers 65*b* to 68*b*, each of which controls a voltage applied to the development power supply, image density sensors 70, and a display 34 (not illustrated) that indicates that the charging roller is not in contact with the photoconductor drum, and the like.

Herein, the respective image formers 65 to 68 are disposed with a distance of, for example, 90 mm from each other, and in the section with fogging development where the contact and separation determination mode is performed, time for applying the bias voltage to the photoconductor drum of each image former is shorter than the pitch/process speed of the photoconductor drum. The process speed refers to the belt rotational speed of the intermediate transfer belt 73. (The rotational speed of each photoconductor drum is also approximately the same value).

In other words, the controller 80 sets the time for applying a bias voltage to each photoconductor drum in the contact and separation determination mode to time shorter than the pitch/process speed between a plurality of photoconductor drums, and sequentially applies a bias voltage to each photoconductor drum at predetermined time intervals to prevent overlapping transfer on the intermediate transfer belt.

With such a configuration, even in a state in which the unlikely event that all the charging rollers in the image former 65 to 68 are separated, the fogging toner images are transferred without overlapping on the belt, and therefore the separation state of the charging rollers can be reliably detected.

Figure 10A:
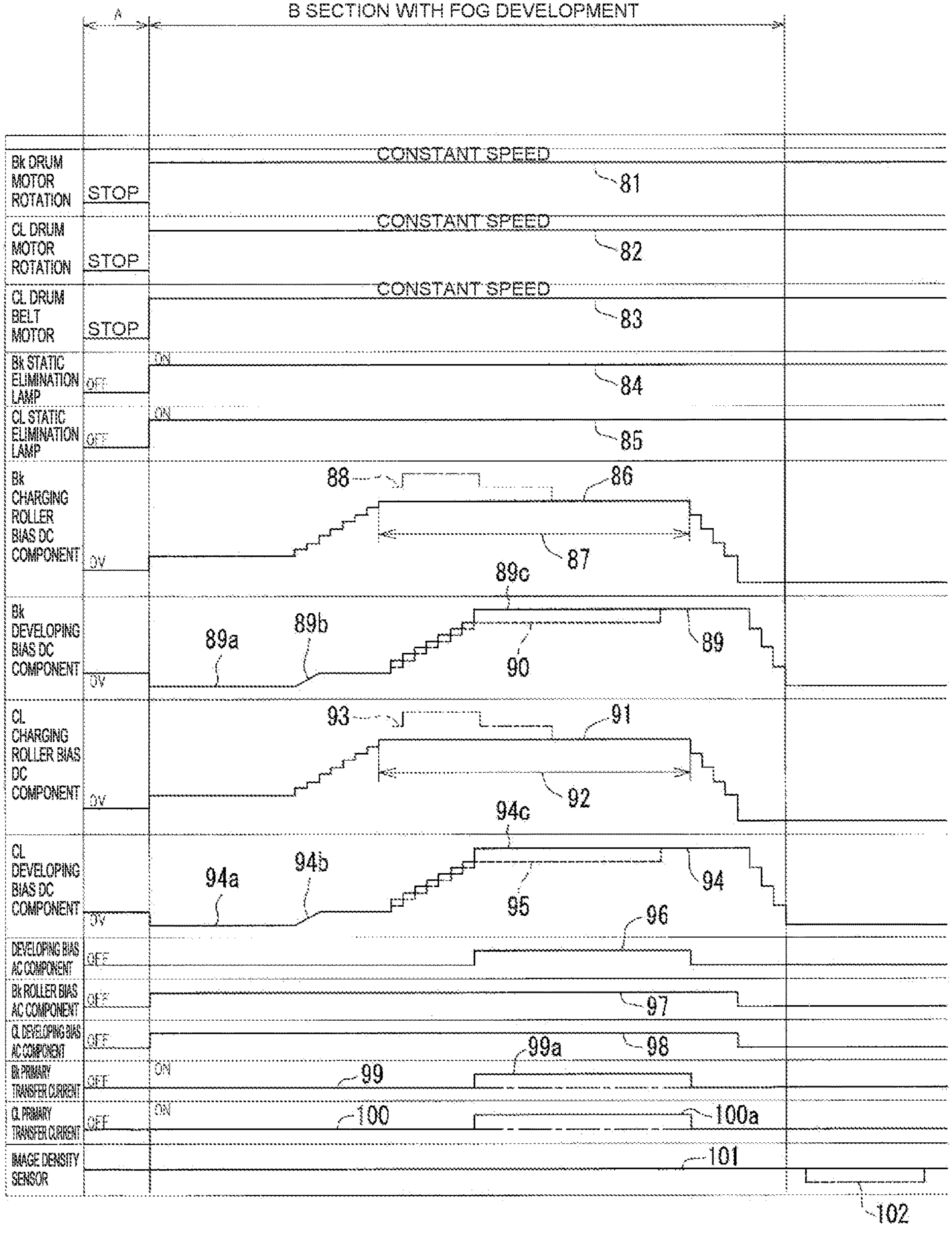
FIG. 10A is a time chart illustrating a charging bias voltage and the like in a section with fogging development in the color image forming apparatus.
Figure 10B:
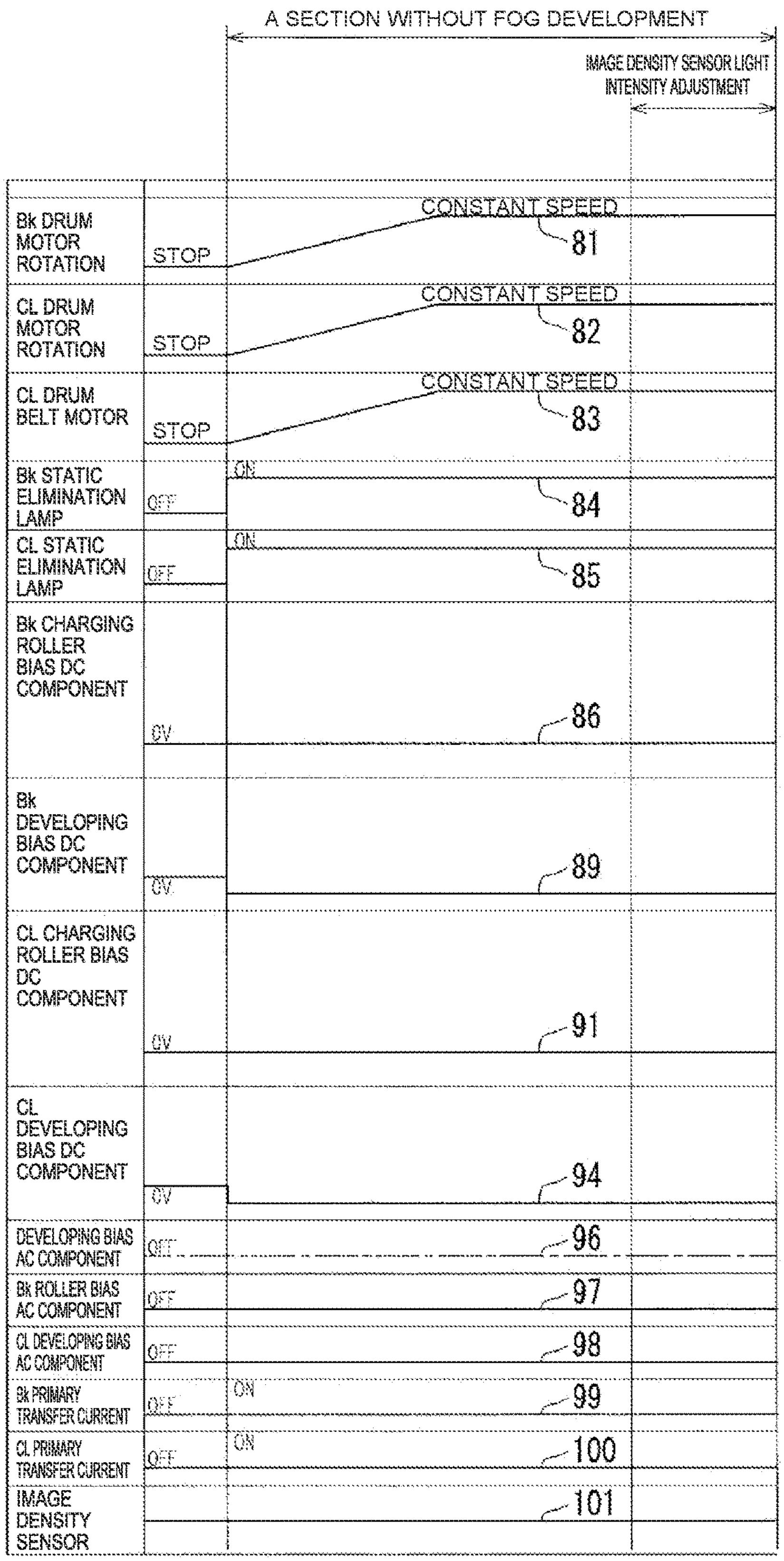
FIG. 10B is a time chart illustrating a charging bias voltage and the like in a section without fogging development in the color image forming apparatus.

Now, a time chart in the color image forming apparatus 63 will be described. FIG. 10A to FIG. 10B are time charts illustrating the respective applied voltages and the like of the charging rollers, developing rollers and the like of the image formers 65 to 68 in the color image forming apparatus 63, and correspond to FIG. 2 and FIG. 7 in the previous embodiment. Herein, as in the previous embodiment, "(B) section with fogging development" will be first described, and thereafter "(A) section without fogging development" will be described.

FIG. 10A is a diagram illustrating a time chart of the "(B) section with fogging development". Herein, photoconductor drum voltages and the like for color are added to the time chart in FIG. 2, which is described with respect to the monochrome image forming apparatus. Herein, the photoconductor drum for color has the four color image formers 65 to 68 as described above. However, in the following description, black is indicated as a black (Bk) photoconductor drum and the three colors except for black are collectively indicated as a color (CL) photoconductor drum.

With reference to FIG. 10A, the time chart of the "(B) section with fogging development" in this embodiment illustrates a motor rotation signal 81 of the black (Bk) photoconductor drum, a motor rotation signal 82 of the color (CL) photoconductor drum, a belt motor rotation signal 83 of the color (CL) photoconductor drum (rotation signal of an intermediate transfer belt driving motor), an ON/OFF signal 84 of a static elimination lamp of a black (Bk) photoconductor drum, an ON/OFF signal 85 of a static elimination lamp of the color (CL) photoconductor drum, a first charging bias voltage 86 of a charging roller of the black (Bk) photoconductor drum, a first developing bias voltage 89 applied to a developing roller of the black (Bk) photoconductor drum, a charging bias voltage 91 of the color (CL) photoconductor drum, a developing bias voltage 94 of the color (CL) photoconductor drum, an ON/OFF signal 96 of a developing bias voltage AC component of the color (CL) photoconductor drum, a charging bias voltage AC component 97 of the black (Bk) photoconductor drum, a developing bias voltage (AC component) 98 of the color (CL) photoconductor drum, an ON/OFF signal 99 of the primary transfer current of the black (Bk) photoconductor drum, an ON/OFF signal 100 of a primary transfer current of the color (CL) photoconductor drum, and a signal 101 indicating the presence or absence of image detection of the image density sensor (image detector) 70, from the top.

The motor rotation signal 81 of the black (Bk) photoconductor drum, the motor rotation signal 82 of the color (CL) photoconductor drum, color (CL) the belt motor rotation signal 83 of the photoconductor drum rotate at constant speed in the "(B) section with fogging development". The ON/OFF signal 84 of the static elimination lamp of the black (Bk) photoconductor drum, and the ON/OFF signal 85 of the static elimination lamp of the color (CL) photoconductor drum are ON in the "(B) section with fogging development".

Now, the time chart of the first charging bias voltage 86 to the charging roller of the black (Bk) photoconductor drum, the first developing bias voltage 89 of the developing roller of the black (Bk) photoconductor drum, the charging bias voltage 91 of the charging roller of the first developing bias voltage 94 of the developing roller of the color (CL) photoconductor drum will be described. In the time chart, the first charging bias voltage 86 and the developing bias voltage 94 are indicated as a charging roller bias DC component and a developing bias DC component, respectively. These bias voltages are also basically the same as those in the first embodiment, and only bias voltages for the color (CL) photoconductor drum are added.

The first bias voltage 86 to the charging roller of the black (Bk) photoconductor drum is applied from to 50 V to 1000 V at the time of ON. A pre-charging bias voltage 88 is provided in the same manner as in the previous embodiment. A charging roller contact and separation check time 87 is also provided in the same manner.

In other words, in the color image forming apparatus 63, in the contact and separation determination mode, the controller 80 causes the charge power supply to output the pre-charging bias voltage 88 for a predetermined time, then outputs the first charging bias voltage 91 lower than the pre-charging bias voltage, and causes the development power supply to output the developing bias voltage 94 before the first charging bias voltage 40*a* is applied.

The first developing bias voltage 89 to the developing roller of the black (Bk) photoconductor drum is basically the same as that in the first embodiment. A reverse bias voltage (+100 V) it applied to this first developing bias voltage 89 before entering the "(B) section with fogging development" (indicated by 89*a* in the figure). Thereafter, as indicated by 89*b* in the figure, the developing bias voltage 89 is linearly increased and maintained for a certain period of time. After that, the applied voltage is raised in a stepwise manner to the first developing bias voltage 43*c* which is about −200 V (predetermined voltage), is maintained for a certain period of time, and then is lowered in a stepwise manner to +100 V which is the original reverse bias voltage. The development is performed during this first developing bias voltage application time.

In this embodiment, the controller 30 also causes the development power supply to output a lower bias voltage than that during image formation and causes the charge power supply to output the same bias voltage as that during image formation, as illustrated by the dotted line 90 in the figure, in the contact and separation determination mode.

Consequently, it is possible to suppress the amount of toner consumed in a case where fogging development is caused. Additionally, it is possible to prevent occurrence of fogging development in a case where the charging roller is in contact.

A voltage of 50 V to 1000 V is applied to the charging bias voltage 91 of the color (CL) photoconductor drum at the time of ON. A pre-charging bias 93 is provided in the same manner as in the previous embodiment. A charging roller contact and separation check time 92 is provided in the same manner.

The developing bias voltage 94 of the color (CL) photoconductor drum is basically the same as that in the first embodiment. A reverse bias voltage (+100 V) it applied to this first developing bias voltage 94 before entering the "(B) section with fogging development" (indicated by 94*a* in the figure). Thereafter, as indicated by 94*b* in the figure, the developing bias voltage 94 is linearly increased and maintained for a certain period of time. After that, the applied voltage is raised in a stepwise manner about −200 V, and the voltage (94*c*) is maintained for a certain period of time, and then is lowered in a stepwise manner to +100 V which is the original reverse bias voltage. The development is performed during this first developing bias voltage application time.

A voltage of 50 V to 1000 V is applied to the developing bias voltage 94 of the color (CL) photoconductor drum at the time of ON. A pre-charging bias voltage 88 is provided in the same manner as in the previous embodiment.

In this embodiment, the controller 80 also causes the development power supply to output a lower developing bias voltage than that during image formation and causes the charge power supply to output the same charging bias voltage as that during image formation, as illustrated by the dotted line 95 in the figure, in the contact and separation determination mode.

The development bias voltage AC component ON/OFF signal 96 to a color primary transfer current and the image density sensor signal displayed below the developing bias voltage 94 are the same as those of the monochrome image forming apparatus described earlier, and therefore description thereof will be omitted.

Now, the section before the "(B) section with fogging development" described in FIG. 10, the "(A) section without fogging development" will be described. FIG. 10B is a time chart illustrating the "(A) section without fogging development", and illustrates the motor rotation signal 81 of the black (Bk) photoconductor drum, the motor rotation signal 82 of the color (CL) photoconductor drum, the belt motor rotation signal 83 of the color (CL) photoconductor drum, the ON/OFF signal 84 of a static elimination lamp of the black (Bk) photoconductor drum, the ON/OFF signal 85 of a static elimination lamp of the color (CL) photoconductor drum, the black (Bk) static elimination lamp, the first charging bias voltage 86 to the charging roller of the black (Bk) photoconductor drum, the developing bias voltage DC component 89 to the developing roller of the black (Bk) photoconductor drum, the charging bias voltage 91 of the color (CL) photoconductor drum, the developing bias voltage 94 of the color (CL) photoconductor drum, the ON/OFF signal 96 of the developing bias voltage AC component, the charging bias voltage AC component 97 of the black (Bk) photoconductor drum, the developing bias voltage AC component 98 of the color (CL) photoconductor drum, the ON/OFF signal 99 of the primary transfer current of the black (Bk) photoconductor drum, the ON/OFF signal 100 of the primary transfer current of the color (CL) photoconductor drum, and the signal 101 indicating the presence or absence of image detection by the image density sensors 70, from the top, as well as the time chart of the "(B) section with fogging development".

The motor rotation signal 81 of the black (Bk) photoconductor drum, the motor rotation signal 82 of the color (CL) photoconductor drum, and the belt motor rotation signal 83 of the color (CL) photoconductor drum are initially stopped, but when entering the "(A) section without fogging development", the rotation speed is linearly increased, and when the rotation speed reaches a predetermined speed, the photoconductor drums rotate at a constant speed.

On the other hand, the ON/OFF signal 84 of the static elimination lamp of the black (Bk) photoconductor drum, and the ON/OFF signal 85 of the static elimination lamp of the color (CL) photoconductor drum are initially OFF, but turned ON when entering (A) section without fogging development.

Now, the time chart of the first bias voltage 86 to the charging roller of the black (Bk) photoconductor drum, the first bias voltage 89 of the developing roller of the black (Bk) photoconductor drum, and the charging bias voltage 91 of the color (CL) photoconductor drum, and the developing bias voltage 94 of the color (CL) photoconductor drum will be described.

First charging bias voltages 86 and 91 to the charging rollers of the black (Bk) and color (CL) photoconductor drums are 0 V in the (A) section without fogging development.

On the other hand, the developing bias voltages 89 and 94 of the black (Bk) and color (CL) photoconductor drums are initially 0 V, but when entering the (A) section without fogging development, a reverse bias voltage of +100 V is applied to each of the developing bias voltages 89 and 94. In this embodiment, an exposure unit (not illustrated) is not operated.

Now, the ON/OFF signal 96 of the developing bias voltage AC component, the charging bias voltage AC component 97 of the black (Bk) photoconductor drum, and the developing bias voltage (AC component) 98 of the color (CL) photoconductor drum, which are indicated under the developing bias voltage 94, will be described. These signals are initially OFF, and maintained in the "(A) section without fogging development".

The ON/OFF signal 99 of the black (Bk) primary transfer current, and the ON/OFF signal 100 of the color (CL) primary transfer current, which are indicated under the developing bias voltage 98, are normally initially OFF, and are maintained in the "(B) section with fogging development". However, in the section with fogging development, the primary transfer currents may be turned on as needed (indicated by 99*a* and 100*a* in the figure).

The signal 101 that indicates the presence or absence, which is indicated under the ON/OFF signal 100, is a signal indicating whether or not the image density sensor 70 detects an image.

In other words, a process similar to the process performed in the monochrome image forming apparatus is basically performed in the color image forming apparatus 63. The light intensity adjustment of the light emitter of the image density sensor to 70 is performed at the end of the (A) section without fogging development and before the (B) section with fogging development. In the light intensity adjustment, the light intensity of the light emitter is adjusted such that the detected value of each image density sensor becomes a predetermined value when there is no toner on the intermediate transfer belt 73.

Figure 11:
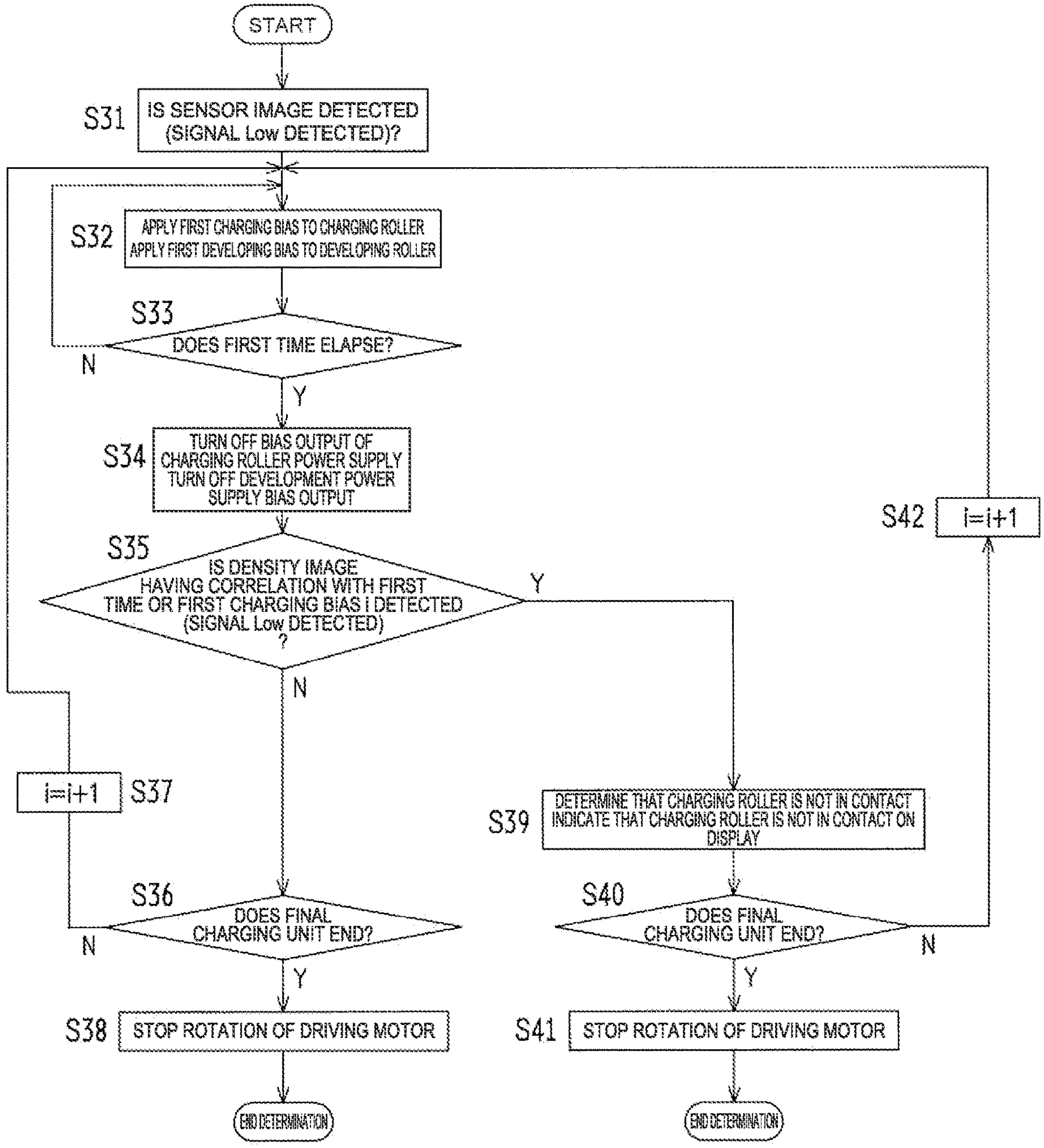
FIG. 11 is a flowchart illustrating a determination method in the color image forming apparatus.

Now, a contact and separation determination mode in the color image forming apparatus 63, performed by the controller 80 will be described with reference to a flowchart. FIG. 11 is a flowchart illustrating a process content of the contact and separation determination mode, which is implemented when the process unit is replaced with a new one.

With reference to FIG. 11, a CPU of the controller 80 first rotates the driving motor (not illustrated) and rotates the four photoconductor drums of Y, M, C and K (S31). The first charging bias voltage is then applied to the i-th (e.g., Y) charging roller and the first developing bias voltage is applied to the i-th developing roller (S32). (Note that i is a number assigned to each color to identify Y, M, C, and K in a control program. In this embodiment, 1 means Y, 2 means M, 3 means C, and 4 means K.) It is determined whether the first time elapses (S33), and when the first time elapses (Y in S33), the output of the first charging bias voltage is turned off, and the output of the developing bias voltage is turned off (S34). When the first time does not elapse in S33 (N in S33), the process returns to S32 and waits for elapse of time.

Next, it is determined whether or not the image density sensors 70 detect a density image (signal Low) that correlates with the first time or the i-th first charging bias voltage (S35). Herein, as in the previous embodiment, the first time is contact and separation check time of charging rollers required until a band-shaped image due to fogging development formed on the photoconductor drum reaches the image density sensors 70.

When the image density sensor 70 do not detect an image (signal Low) in S35 (N in S35), it is determined whether the determination is completed to a last (i=4, i.e., K) charging unit (S36). Otherwise (N at S36), the process returns to S32 as i=i+1 (S37), and repeats until i=4 is established. When the image (signal Low) is detected in S35 (Y in S35), it is determined that the charging rollers are not in contact with the photoconductor drums, and this determination is indicated on the display 34 (S39). It is determined whether the last unit is finished (i=4) (S40), otherwise (N in S40), the process returns to S32 as i=i+1 (S42).

As described above, in this embodiment, in the color image forming apparatus 63, the developing bias voltages and charging bias voltages are controlled to create a section with fogging development in which fogging development is generated, and the image density sensor 70 detects a fogging development patch, which is a toner image formed only when the charging rollers are separated. Consequently, it is possible to confirm that the charging rollers are in a separate (trouble) state.

As a result, it is possible to effectively determine the contact and separation state of the charging rollers with and from the photoconductor drums by execution of the contact and separation determination mode using the existing image density sensors 70.

In the section without fogging development before the section with fogging development, from the color (Y) image former 65, which is the farthest away from the image density sensor 70, to the image density sensor 70, in the color image forming apparatus 63 illustrated in FIG. 9, the intermediate transfer belt 73 and the photoconductor drum are idled by causing the development power supply to output a reverse bias voltage with a different polarity from the bias voltage during image formation.

In other words, before the release determination mode is executed, the controller 80 causes the development power supply to output a reverse bias voltage to idle the intermediate transfer belt 73 and the photoconductor drums. By performing such a process, it is possible to prevent the toner from being developed from the development unit when a cleaner recovers residual toner remaining on the belt due to previous image forming operation, so that it is possible to reliably perform cleaning.

Figure 12A:
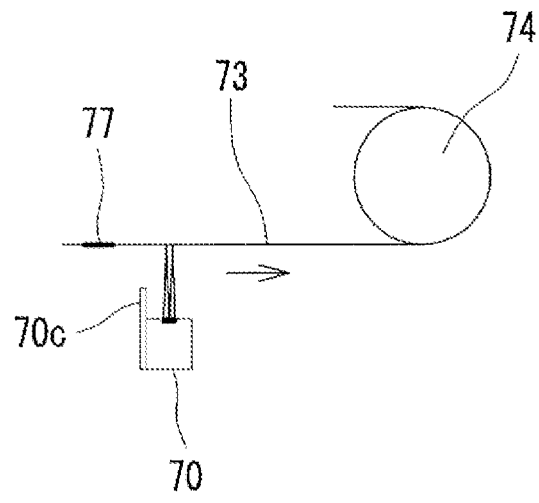
FIG. 12A is a diagram illustrating an image density sensor in the color image forming apparatus.
Figure 12B:
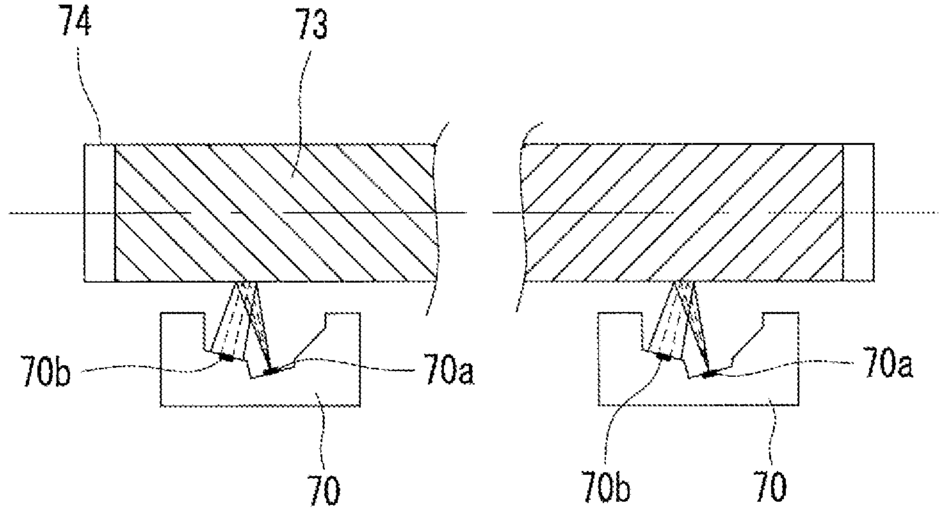
FIG. 12B is a diagram illustrating the image density sensor in the color image forming apparatus.

Now, the image density sensors 70 will be described. FIG. 12A illustrates the image density sensor 70 when the intermediate transfer belt 73 driven by an intermediate transfer belt driving roller 74 is viewed from the axial direction of the intermediate transfer belt driving roller 74, and FIG. 12B illustrates the image density sensors 70 provided at the bottom of the intermediate transfer belt 73, when the image density sensor 70 are viewed from the longitudinal direction of the intermediate transfer belt 73.

The image density sensors 70 are basically the same as the image density sensors 22 described in the previous embodiment. With reference to FIG. 12A and FIG. 12B, each image density sensor 70 is rectangular viewed from the axial direction of the intermediate transfer belt driving roller 74 of the intermediate transfer belt 73, has a sensor mounting part 70*c* on a surface on one side, and the two image density sensors 70 are provided along the longitudinal direction of the intermediate transfer belt driving roller 74 of the intermediate transfer belt 73. FIG. 12A illustrates a formed toner pattern 77.

Each image density sensor 70 has a recess along the longitudinal direction of the intermediate transfer belt 73. The intermediate transfer belt 73 is irradiated with light from a light emitter 70*a* provided in the center of the image density sensor 70, and reflected light from the intermediate transfer belt 73 is received by a light receiver 70*b*.

Figure 13:
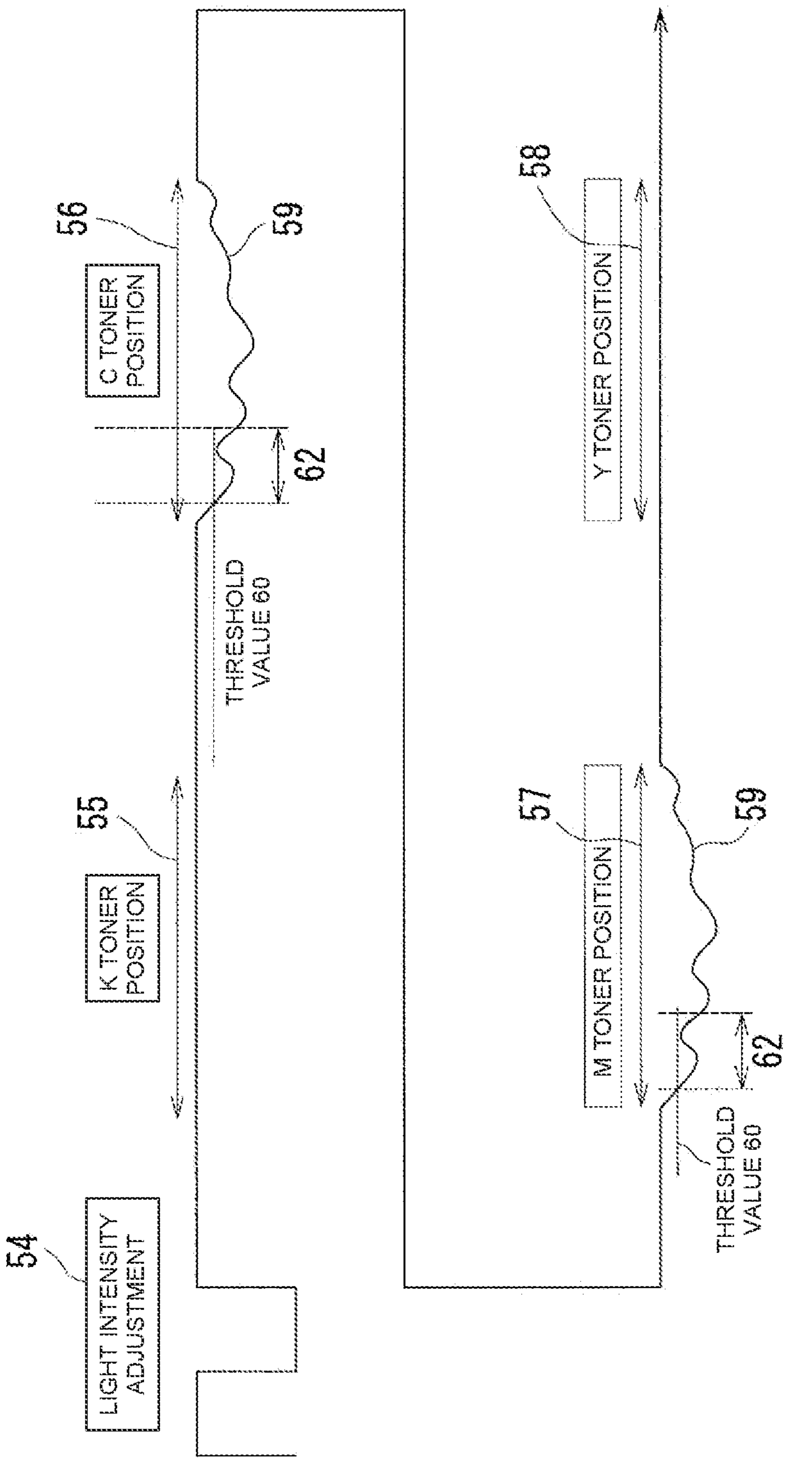
FIG. 13 is a diagram illustrating a method of detecting fogging in the color image forming apparatus.

Now, a specific method of fogging detection using black and color toners in this embodiment will be described. FIG. 13 is a diagram illustrating this method, and illustrates a black (K) toner position 55, a cyan (C) toner position 56, a magenta (M) toner position 57, a yellow (Y) toner position 58, and the signal level of the image density sensor 70 on the intermediate transfer belt 73, signal levels of the image density sensors 70 at the toner positions, and threshold value for determining fogging. With reference to FIG. 13, light intensity adjustment 54 of the image density sensors 70 is first performed. Thereafter, fogging images are detected sequentially from the black (K) toner position 55, to the cyan (C) toner position 56, the magenta (M) toner position 57, and the yellow (Y) toner position 58. As illustrated herein, each fogging image is formed at a certain distance from the other. Herein, respective detection signals 59 of the image density sensors 70 at the cyan (C) toner position 56 and the magenta (M) toner position, and threshold values 60 for determination are illustrated. In the figure, when the detection signals 59 of the image density sensors 70 each exceed predetermined fogging detection determination time 62 and fall below the threshold value 60, it is determined that there is a fogging image. Herein, it can be determined that the magenta (M) charging roller and the cyan (C) charging roller are separated.

In this embodiment, an image is formed using the intermediate transfer belt 73, and therefore when there is a scratch on the intermediate transfer belt 73, the image density sensors 70 can detect the scratch as the image.

Therefore, in this embodiment, the controller 80 determines that the image is a fogging image caused by the separation of the charging rollers in a case where time when the image density sensors 70 detect the image is longer than 2 mm/process speed in the contact and separation determination mode.

In a case where there is a scratch on the surface of the intermediate transfer belt 73, the scratch is about 2 mm at the largest, and therefore it can be reliably determined that the charging roller is separated when the image is detected at 2 mm/process speed or more. The process speed refers to belt rotation speed of the intermediate transfer belt 73, as described above.

As described above, in this embodiment, the controller 80 causes the charging roller and the developer of each of the image formers 65 to 68 to output predetermined bias voltages, and causes the intermediate transfer power supply 71 to output a predetermined transfer bias voltage, in the release determination mode. As a result, the fogging toner image on each photoconductor drum is actively transferred onto the intermediate transfer belt 73, so that the image density sensors 70 can easily detect the image.

In the color image forming apparatus 63, the controller 80 can also execute a development prevention mode (second mode) in which the bias voltages 89 and 94 of the charge power supplies are not output and a second developing bias voltages (reverse bias voltages) 89*a* and 94*a*, whose polarities are different from those at the time of image formation, are output to the development power supplies. The development prevention mode is executed before execution of the contact and separation determination mode, and the light intensity adjustment of the image density sensors 70 are performed during the development prevention mode.

In this embodiment, the development prevention mode (second mode) is executed before the execution of the contact and separation determination mode (first mode), so that it is possible to improve detection accuracy of an image with fogging development.

During the execution of the development prevention mode, the probability of adherence of toner onto the intermediate transfer belt 73 can be reduced because a situation in which the toner moves as little as possible on the respective photoconductor drums of the image formers 65 to 68 is achieved. In other words, the surface of the intermediate transfer belt 73 can be made clean and free of toner adhesion, and therefore it is possible to increase the adjustment accuracy of light intensity adjustment.

The present disclosure can be implemented in various other forms without departing from the spirit or principal features of the present disclosure. Therefore, the embodiments described above are merely examples and should not be interpreted restrictively. All modifications and changes belonging to an equivalent scope of the claims of the present disclosure are within the scope of the present disclosure.

INDUSTRIAL APPLICABILITY

The present disclosure is useful as an image forming apparatus with a charging roller because it is possible to execute the contact and separation determination mode in which a contact and separation state is determined using fogging development that forms an image when normal image forming operation is performed in a case where the photoconductor drum and the charging roller are in a non-contact state.

What is claimed is:

1. An image forming apparatus comprising:

a photoconductor drum;

a charging roller that charges a surface of the photoconductor drum, and is capable of contacting with and separating from the photoconductor drum by a contact and separation mechanism;

a developer that forms a toner image on the surface of the photoconductor drum;

an image detector that detects the toner image formed by the developer;

a charge power supply that applies a bias voltage to the charging roller;

a development power supply that applies a bias voltage to the developer; and a controller, wherein the controller causes the charge power supply and the development power supply to output respective predetermined bias voltages for predetermined time, and is capable of executing a contact and separation determination mode in which a contact and separation state of the charging roller is determined based on whether or not a toner image is detected by the image detector after output of the respective bias voltages.

2. The image forming apparatus according to claim 1, wherein in the contact and separation determination mode, the controller causes the development power supply to output a bias voltage lower than that during image formation, and causes the charge power supply to output the same bias voltage as that during image formation.

3. The image forming apparatus according to claim 1, wherein in the contact and separation determination mode, the controller causes the charge power supply to output a pre-charging bias voltage for predetermined time, and thereafter to output a first charging bias voltage lower than the pre-charging bias voltage, and causes the development power supply to output a first developing bias voltage before the first charging bias voltage is applied.

4. The image forming apparatus according to claim 1, wherein when causing the charge power supply and the development power supply to output respective bias voltages, the controller gradually changes the respective bias voltages to target bias voltages, or when causing the charge power supply and the development power supply to stop output, the controller gradually reduces the output to 0.

5. The image forming apparatus according to claim 1, wherein the image detector has a light emitter, and the controller is capable of executing a development prevention mode in which a bias voltage of the charge power supply is not output and the development power supply outputs a second developing bias voltage whose polarity is different from a bias voltage during image formation, the development prevention mode is executed before execution of the contact and separation determination mode, and light intensity of the light emitter of the image detector is adjusted during execution of the development prevention mode.

6. The image forming apparatus according to claim 1, the image forming apparatus being a color image forming apparatus, further comprising:

an intermediate transfer belt, a plurality of the charging rollers, a plurality of the photoconductor drums, and a plurality of the developers that are provided on an outer circumference of the intermediate transfer belt;

intermediate transfer members that perform intermediate transfer of respective toner images formed on surfaces of the plurality of photoconductor drums onto the intermediate transfer belt; and intermediate transfer power supplies that apply bias voltages to the intermediate transfer members, wherein the image detector detects the toner images on the intermediate transfer belt, and in the contact and separation determination mode, the controller causes the charge power supply and the development power supply to output respective predetermined bias voltages to the plurality of charging rollers and the plurality of developers, and causes the intermediate transfer power supplies to output predetermined transfer bias voltages.

7. The image forming apparatus according to claim 6, wherein the controller executes idling of rotating the intermediate transfer belt and the photoconductor drums for predetermined time by causing the development power supply to output a reverse bias voltage with a different polarity from a bias voltage output during image formation before execution of the contact and separation determination mode.

8. The image forming apparatus according to claim 6, wherein the controller sets time for applying a bias voltage to each of the plurality of photoconductor drums in the contact and separation determination mode to time shorter than pitch/process speed between a plurality of the photoconductor drums, and sequentially outputs a bias voltage to each of the photoconductor drums at a predetermined time interval to prevent overlapping transfer on the intermediate transfer belt.

9. The image forming apparatus according to claim 6, wherein the controller determines that the charging rollers are separated in a case where time during which the image detector detects an image is longer than 2 mm/process speed in the contact and separation determination mode.

10. The image forming apparatus according to claim 1, wherein a process unit including the photoconductor drum and the charging roller is provided, and the process unit has a contact and separation mechanism capable of changing the charging roller between a separate position and a contact position with respect to the photoconductor drum.

* * * * *